United States Patent
Luby et al.

(10) Patent No.: US 9,596,281 B2
(45) Date of Patent: Mar. 14, 2017

(54) TRANSPORT ACCELERATOR IMPLEMENTING REQUEST MANAGER AND CONNECTION MANAGER FUNCTIONALITY

(71) Applicant: QUALCOMM Incorporated, San Diego, CA (US)

(72) Inventors: Michael George Luby, Berkeley, CA (US); Lorenz Christoph Minder, Evanston, IL (US); Yinian Mao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 14/289,403

(22) Filed: May 28, 2014

(65) Prior Publication Data
US 2015/0271232 A1    Sep. 24, 2015

Related U.S. Application Data

(60) Provisional application No. 61/954,970, filed on Mar. 18, 2014.

(51) Int. Cl.
*H04L 29/08* (2006.01)
*H04L 29/06* (2006.01)

(52) U.S. Cl.
CPC .......... *H04L 65/60* (2013.01); *H04L 65/4084* (2013.01); *H04L 65/80* (2013.01);
(Continued)

(58) Field of Classification Search
CPC ..... H04L 65/4084; H04L 65/80; H04L 65/60; H04L 67/02; H04L 67/108; H04L 67/10; H04L 67/14
See application file for complete search history.

(56) References Cited

U.S. PATENT DOCUMENTS

| 7,447,235 B2 | 11/2008 | Luby et al. |
| 7,502,860 B1 | 3/2009 | Champagne |

(Continued)

FOREIGN PATENT DOCUMENTS

| EP | 2615790 A1 | 7/2013 | |
| FR | WO 2011101371 A1 * | 8/2011 | ....... H04N 21/44209 |

(Continued)

OTHER PUBLICATIONS

Seth A., et al., "A Policy-Oriented Architecture for Opportunistic Communication on Multiple Wireless Networks," IEEE Transactions on Mobile Computing, Aug. 2006, pp. 1-15.
(Continued)

*Primary Examiner* — Uzma Alam
(74) *Attorney, Agent, or Firm* — Norton Rose Fulbright US LLP

(57) ABSTRACT

Transport accelerator (TA) systems and methods for delivery of content to a user agent (UA) of the client device from a content server are provided according to embodiments of the present disclosure. Embodiments of a TA operate to subdivide, by a request manager (RM) of the TA, fragment requests provided by the UA each into a plurality of chunk requests for requesting chunks of the content and to provide, by the RM to a connection manager (CM) of the TA, chunk requests of the plurality of chunk requests for requesting chunks of the content. Requests may thus be made, by the CM, for the chunks of the content from the content server via a plurality of connections established between the CM and the content server.

58 Claims, 17 Drawing Sheets

(52) U.S. Cl.
CPC .............. *H04L 67/02* (2013.01); *H04L 67/10* (2013.01); *H04L 67/14* (2013.01)

(56) References Cited

U.S. PATENT DOCUMENTS

| | | | |
|---|---|---|---|
| 8,396,126 B2 | 3/2013 | Rodriguez et al. | |
| 8,612,624 B2* | 12/2013 | Frueck | H04L 29/06027 |
| | | | 709/231 |
| 8,750,188 B2 | 6/2014 | Nicoara et al. | |
| 8,838,095 B2 | 9/2014 | Jouin | |
| 9,172,659 B1* | 10/2015 | Roitshtein | H04L 49/106 |
| 2002/0107971 A1* | 8/2002 | Bailey | H04L 12/2602 |
| | | | 709/231 |
| 2002/0164024 A1 | 11/2002 | Arakawa et al. | |
| 2005/0273592 A1* | 12/2005 | Pryor | H04L 9/32 |
| | | | 713/150 |
| 2008/0208985 A1 | 8/2008 | Georgis et al. | |
| 2011/0239078 A1 | 9/2011 | Luby et al. | |
| 2012/0057511 A1 | 3/2012 | Sivakumar et al. | |
| 2012/0140621 A1 | 6/2012 | Wu et al. | |
| 2012/0271880 A1* | 10/2012 | Sachdeva | H04L 67/06 |
| | | | 709/203 |
| 2012/0272124 A1 | 10/2012 | Huang | |
| 2012/0311174 A1 | 12/2012 | Bichot et al. | |
| 2012/0327779 A1 | 12/2012 | Gell et al. | |
| 2013/0013799 A1 | 1/2013 | Keum et al. | |
| 2013/0028089 A1 | 1/2013 | Ramakrishnan | |
| 2013/0095806 A1 | 4/2013 | Salkintzis et al. | |
| 2013/0132507 A1 | 5/2013 | Swaminathan et al. | |
| 2013/0166982 A1 | 6/2013 | Zheng et al. | |
| 2013/0191511 A1 | 7/2013 | Liu et al. | |
| 2013/0227080 A1 | 8/2013 | Gao et al. | |
| 2013/0227102 A1 | 8/2013 | Beck et al. | |
| 2013/0227122 A1 | 8/2013 | Gao et al. | |
| 2013/0246643 A1 | 9/2013 | Luby et al. | |
| 2013/0254631 A1 | 9/2013 | Luby et al. | |
| 2013/0304847 A1 | 11/2013 | Ewanchuk et al. | |
| 2013/0311614 A1* | 11/2013 | Salkintzis | H04W 76/025 |
| | | | 709/219 |
| 2013/0339543 A1 | 12/2013 | Fall | |
| 2014/0156863 A1* | 6/2014 | Gao | H04L 65/4084 |
| | | | 709/231 |
| 2014/0323178 A1 | 10/2014 | Wei et al. | |
| 2014/0325024 A1* | 10/2014 | Lyle | H04L 29/08027 |
| | | | 709/219 |
| 2014/0330887 A1* | 11/2014 | Gilberton | H04L 47/196 |
| | | | 709/202 |
| 2015/0127775 A1* | 5/2015 | Munagala | H04L 65/601 |
| | | | 709/219 |
| 2015/0172352 A1* | 6/2015 | Gopalakrishnan | H04L 65/608 |
| | | | 709/219 |

FOREIGN PATENT DOCUMENTS

| | | | | |
|---|---|---|---|---|
| FR | EP 2615790 A1 * | 7/2013 | ......... | H04L 65/4084 |
| GB | EP 2833640 A1 * | 2/2015 | ....... | H04N 21/23106 |
| TN | WO 2013030096 A1 * | 3/2013 | ......... | H04N 21/2343 |
| WO | WO-2005109224 A2 | 11/2005 | | |
| WO | WO-2011038034 A1 | 3/2011 | | |
| WO | WO-2013030096 | 3/2013 | | |
| WO | WO-2013067219 A2 | 5/2013 | | |
| WO | WO-2013130473 A1 | 9/2013 | | |

OTHER PUBLICATIONS

Detti A., et al., "Supporting Mobile Applications with Information Centric Networking: the Case of P2P Live Adaptive Video Streaming," Proceedings of the 3rd ACM SIGCOMM workshop on Information-centric networking, 2013, pp. 35-36.

Kaspar D., et al., "Using HTTP Pipelining to Improve Progressive Download over Multiple Heterogeneous Interfaces," IEEE International Conference on Communications (ICC), 2010, 5 pages.

Kim, J., et al., "Multi-source Multipath HTTP (mHTTP): A Proposal," Dec. 10, 2013, 12 pages, Cornell University Library, Available at http://arxiv.org/abs/1310.2748.

International Search Report and Written Opinion—PCT/US2015/021056—ISA/EPO—Jul. 6, 2015.

* cited by examiner

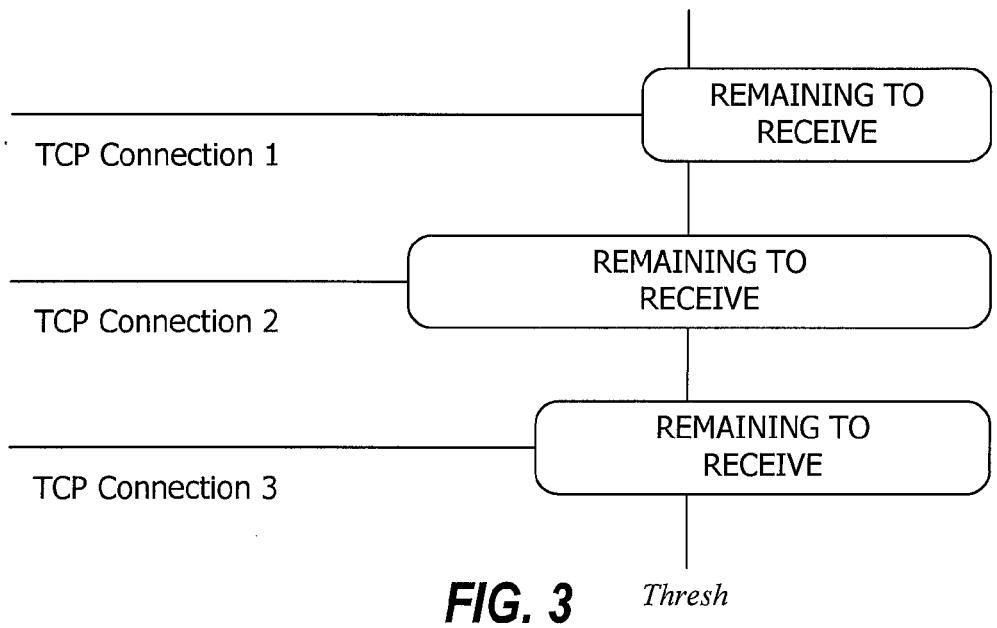
FIG. 3  *Thresh*
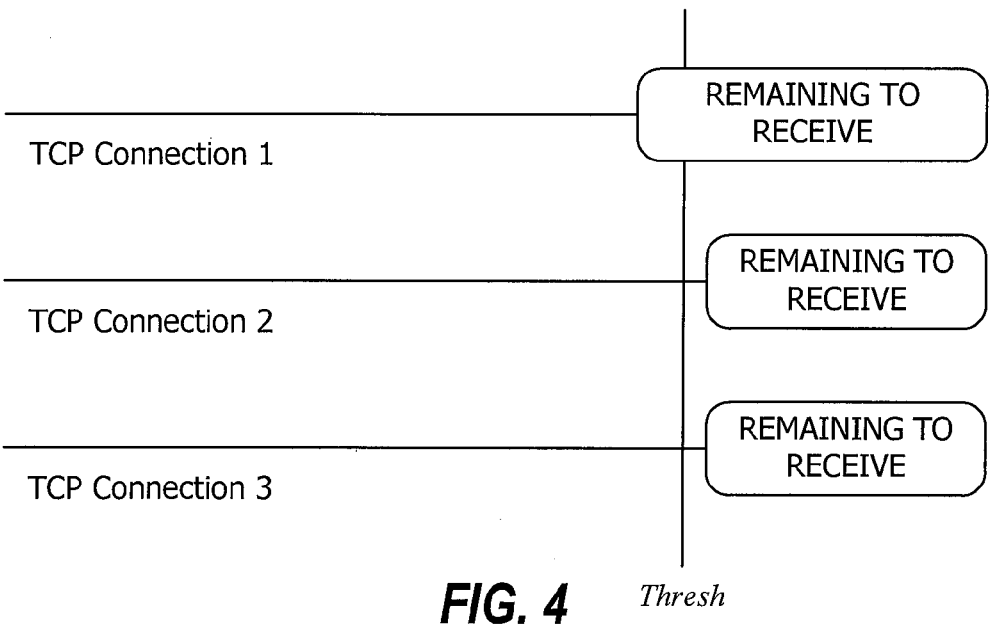
FIG. 4  *Thresh*

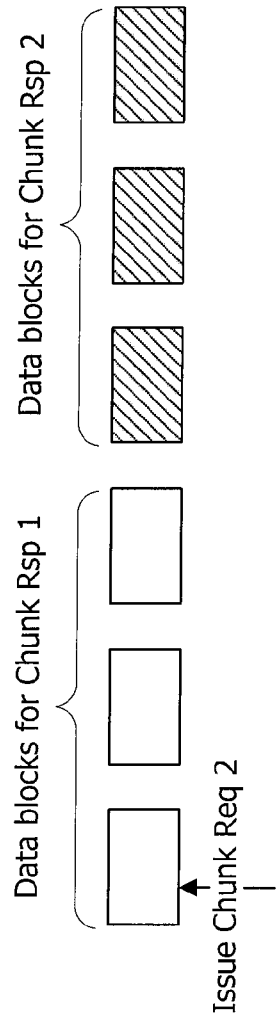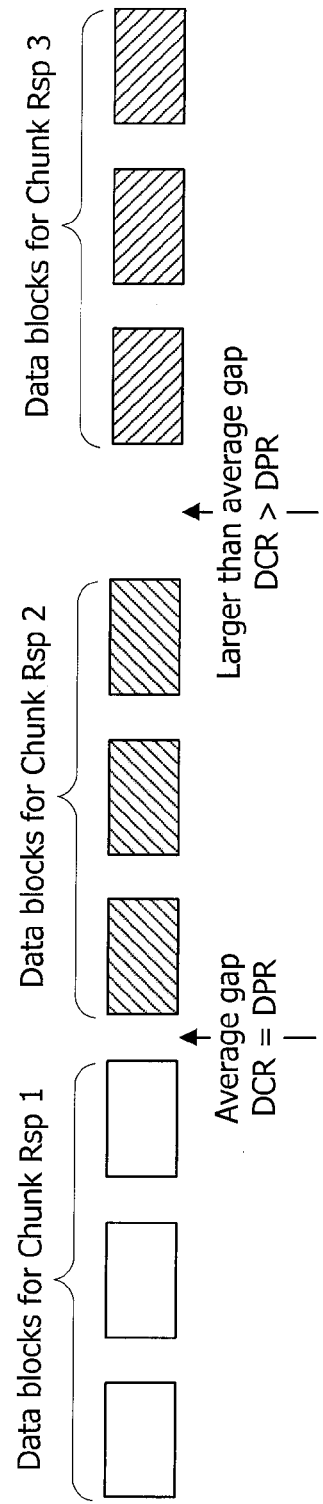

US 9,596,281 B2

TRANSPORT ACCELERATOR IMPLEMENTING REQUEST MANAGER AND CONNECTION MANAGER FUNCTIONALITY

PRIORITY AND RELATED APPLICATIONS STATEMENT

The present application claims priority to U.S. Provisional Patent Application No. 61/954,970, entitled "TRANSPORT ACCELERATOR IMPLEMENTING REQUEST MANAGER AND CONNECTION MANAGER FUNCTIONALITY," filed Mar. 18, 2014, the disclosure of which is hereby incorporated herein by reference. This application is related to commonly assigned U.S. patent application Ser. No. 14/289,016, entitled "TRANSPORT ACCELERATOR IMPLEMENTING EXTENDED TRANSMISSION CONTROL FUNCTIONALITY," filed May 28, 2014, Ser. No. 14/289,181, entitled "TRANSPORT ACCELERATOR IMPLEMENTING EXTENDED TRANSMISSION CONTROL FUNCTIONALITY," filed May 28, 2014, Ser. No. 14/289,348, entitled "TRANSPORT ACCELERATOR IMPLEMENTING ENHANCED SIGNALING," filed May 28, 2014, Ser. No. 14/289,458, entitled "TRANSPORT ACCELERATOR IMPLEMENTING SELECTIVE UTILIZATION OF REDUNDANT ENCODED CONTENT DATA FUNCTIONALITY," filed May 28, 2014, and issued as U.S. Pat. No. 9,350,484 on May 24, 2016, Ser. No. 14/289,476, entitled "TRANSPORT ACCELERATOR IMPLEMENTING A MULTIPLE INTERFACE ARCHITECTURE," filed May 28, 2014, and Ser. No. 14/289,499, entitled "TRANSPORT ACCELERATOR IMPLEMENTING CLIENT SIDE TRANSMISSION FUNCTIONALITY," filed May 28, 2014, each of which being concurrently filed herewith and the disclosures of which are expressly incorporated by reference herein in their entirety.

DESCRIPTION OF THE RELATED ART

More and more content is being transferred over available communication networks. Often, this content includes numerous types of data including, for example, audio data, video data, image data, etc. Video content, particularly high resolution video content, often comprises a relatively large data file or other collection of data. Accordingly, a user agent (UA) on an end user device or other client device which is consuming such content often requests and receives a sequence of fragments of content comprising the desired video content. For example, a UA may comprise a client application or process executing on a user device that requests data, often multimedia data, anti receives the requested data for further processing and possibly for display on the user device.

Many types of applications today rely on HTTP for the foregoing content delivery. In many such applications the performance of the HTTP transport is critical to the user's experience with the application. For example, live streaming has several constraints that can hinder the performance of a video streaming client. Two constraints stand out particularly. First, media segments become available one after another over time. This constraint prevents the client from continuously downloading a large portion of data, which in turn affects the accuracy of download rate estimate. Since most streaming clients operate on a "request-download-estimate", loop, it generally does not do well when the download estimate is inaccurate. Second, when viewing a live event streaming, users generally don't want to suffer a long delay from the actual live event timeline. Such a behavior prevents the streaming client from building up a large buffer, which in turn may cause more rebuffering.

SUMMARY

A method for accelerating, by a transport accelerator (TA) of a client device, delivery of content to a user agent (UA) of the client device from a content server is provided according to embodiments of the present disclosure. The method of embodiments includes subdividing, by a request manager (RM) of the TA, fragment requests provided by the UA each into a plurality of chunk requests for requesting chunks of the content, wherein a size of content chunks of the chunk requests is determined to increase network transfer rate independent of network congestion avoidance operation of the content server. The method of embodiments further includes providing, by the RM to a connection manager (CM) of the TA, chunk requests of the plurality of chunk requests for requesting chunks of the content, and requesting, by the CM, the chunks of the content from the content server via a plurality of connections established between the CM and the content server.

An apparatus configured for accelerating, by a transport accelerator (TA) of a client device, delivery of content to a user agent (UA) of the client device from a content server is provided according to embodiments of the disclosure. The apparatus of embodiments includes means for subdividing, by a request manager (RM) of the TA, fragment requests provided by the UA each into a plurality of chunk requests for requesting chunks of the content, wherein a size of content chunks of the chunk requests is determined to increase network transfer rate independent of network congestion avoidance operation of the content server. The apparatus of embodiments further includes means for providing, by the RM to a connection manager (CM) of the TA, chunk requests of the plurality of chunk requests for requesting chunks of the content, and means for requesting, by the CM, the chunks of the content from the content server via a plurality of connections established between the CM and the content server.

A computer program product for accelerating, by a transport accelerator (TA) of a client device, delivery of content to a user agent (UA) of the client device from a content server is provided according to embodiments of the present disclosure. The computer program product of embodiments includes a non-transitory computer-readable medium having program code recorded thereon. The program code of embodiments includes program code to subdivide, by a request manager (RM) of the TA, fragment requests provided by the UA each into a plurality of chunk requests for requesting chunks of the content, wherein a size of content chunks of the chunk requests is determined to increase network transfer rate independent of network congestion avoidance operation of the content server. The program code of embodiments further includes program code to provide, by the RM to a connection manager (CM) of the TA, chunk requests of the plurality of chunk requests for requesting chunks of the content, and program code to request, by the CM, the chunks of the content from the content server via a plurality of connections established between the CM and the content server.

An apparatus configured for accelerating, by a transport accelerator (TA) of a client device, delivery of content to a user agent (UA) of the client device from a content server is provided according to embodiments of the present disclosure. The apparatus of embodiments includes at least one processor and a memory coupled to the at least one processor. The at least one processor of embodiments is configured to subdivide, by a request manager (RM) of the TA, fragment requests provided by the UA each into a plurality of chunk requests for requesting chunks of the content, wherein a size of content chunks of the chunk requests is determined to increase network transfer rate independent of network congestion avoidance operation of the content server. The at least one processor of embodiments is further configured to provide, by the RM to a connection manager (CM) of the TA, chunk requests of the plurality of chunk requests for requesting chunks of the content, and to request, by the CM, the chunks of the content from the content server via a plurality of connections established between the CM and the content server.

BRIEF DESCRIPTION OF THE DRAWINGS

FIG. 3 shows an exemplary embodiment of a Connection Manager employing a threshold parameter for determining when another chunk of data can be requested on a connection.

FIG. 4 shows an exemplary embodiment of a Connection Manager employing a threshold parameter for determining when the Connection Manager is currently able to immediately make a chunk request.

FIGS. 10A-10C show results of various T value selections according to embodiments of the present disclosure.

FIG. 11 shows average gaps for various Download Chunk Rate and Download Pipeline Rate combinations according to embodiments of the present disclosure.

DETAILED DESCRIPTION

Figure 1A:
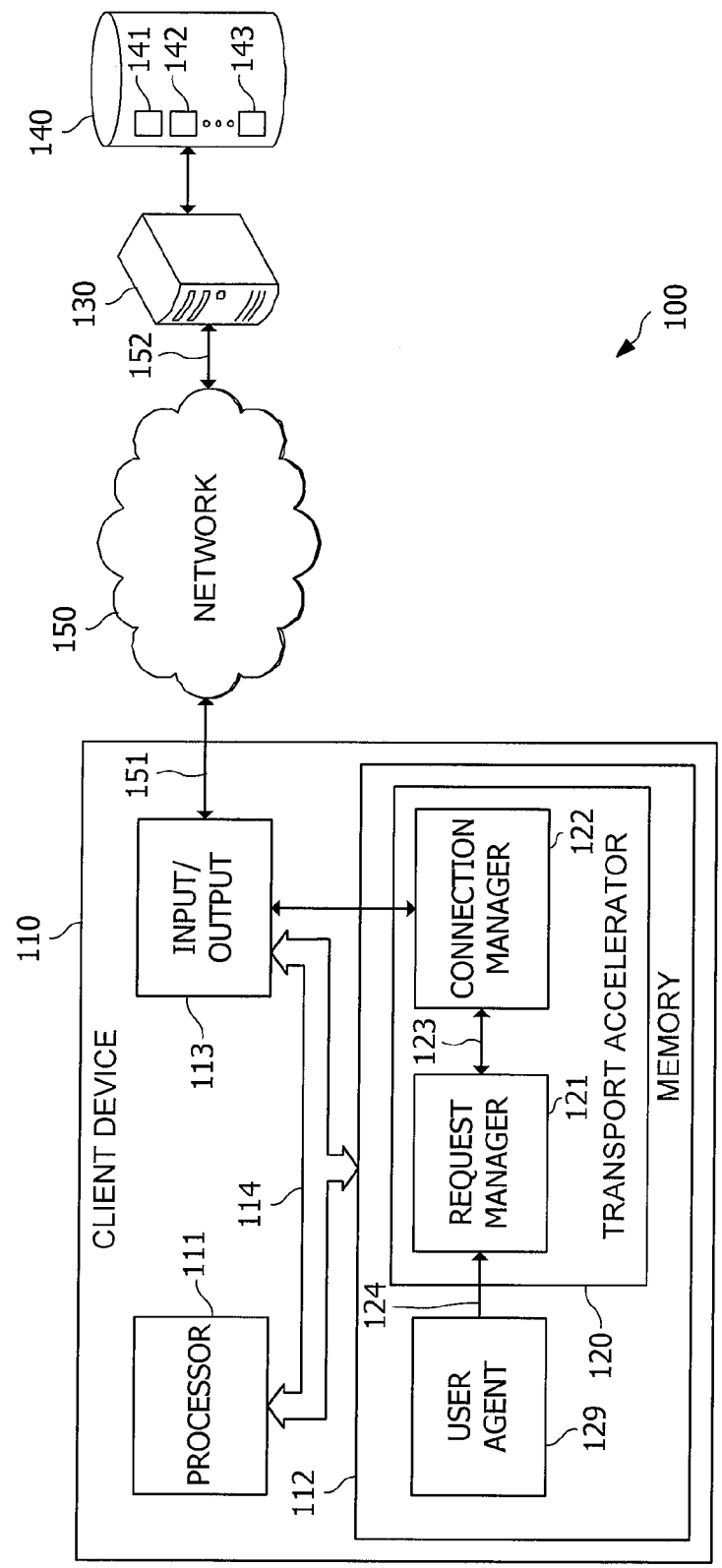
FIG. 1A shows a system adapted for transport acceleration operation according to embodiments of the present disclosure.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the term "content" may include data having video, audio, combinations of video and audio, or other data at one or more quality levels, the quality level determined by bit rate, resolution, or other factors. The content may also include executable content, such as: object code, scripts, byte code, markup language files, and patches. In addition, "content" may also include files that are not executable in nature, such as documents that may need to be opened or other data files that need to be accessed.

As used in this description, the term "fragment" refers to one or more portions of content that may be requested by and/or received at a user device.

As used in this description, the term "streaming content" refers to content that may be sent from a server device and received at a user device according to one or more standards that enable the real-time transfer of content or transfer of content over a period of time. Examples of streaming content standards include those that support de-interleaved (or multiple) channels and those that do not support de-interleaved (or multiple) channels.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

As used herein, the terms "user equipment," "user device," and "client device" include devices capable of requesting and receiving content from a web server and transmitting information to a web server. Such devices can be a stationary devices or mobile devices. The terms "user equipment," "user device," and "client device" can be used interchangeably.

As used herein, the term "user" refers to an individual receiving content on a user device or on a client device and transmitting information to a website.

FIG. 1A shows system 100 adapted according to the concepts herein to provide transfer of content, such as may comprise audio data, video data, image data, file data, etc., over communication networks. Accordingly, client device 110 is shown in communication with server 130 via network 150, whereby server 130 may transfer various content stored in database 140 to client device 110 in accordance with the concepts of the present disclosure. It should be appreciated that, although only a single client device and a single server and database are represented in FIG. 1A, system 100 may comprise a plurality of any or all such devices. For example, server 130 may comprise a server of a server farm, wherein a plurality of servers may be disposed centrally and/or in a distributed configuration, to serve high levels of demand for content transfer. Alternatively, server 130 may be collocated on the same device as transport accelerator 120 (e.g., connected to transport accelerator 120 directly through I/O element 113, instead of through network 150) such as when some or all of the content resides in a database 140 (cache) that is also collocated on the device and provided to transport accelerator 120 through server 130. Likewise, users may possess a plurality of client devices and/or a plurality of users may each possess one or more client devices, any or all of which are adapted for content transfer according to the concepts herein.

Client device 110 may comprise various configurations of devices operable to receive transfer of content via network 150. For example, client device 110 may comprise a wired device, a wireless device, a personal computing device, a tablet or pad computing device, a portable cellular telephone, a WiFi enabled device, a Bluetooth enabled device, a television, a pair of glasses having a display, a pair of augmented reality glasses, or any other communication, computing or interface device connected to network 150 which can communicate with server 130 using any available methodology or infrastructure. Client device 110 is referred to as a "client device" because it can function as, or be connected to, a device that functions as a client of server 130.

Client device 110 of the illustrated embodiment comprises a plurality of functional blocks, shown here as including processor 111, memory 112, and input/output (I/O) element 113. Although not shown in the representation in FIG. 1A for simplicity, client device 110 may comprise additional functional blocks, such as a user interface, a radio frequency (RF) module, a camera, a sensor array, a display, a video player, a browser, etc., some or all of which may be utilized by operation in accordance with the concepts herein. The foregoing functional blocks may be operatively connected over one or more buses, such as bus 114. Bus 114 may comprises the logical and physical connections to allow the connected elements, modules, and components to communicate and interoperate.

Memory 112 can be any type of volatile or non-volatile memory, and in an embodiment, can include flash memory. Memory 112 can be permanently installed in client device 110, or can be a removable memory element, such as a removable memory card. Although shown as a single element, memory 112 may comprise multiple discrete memories and/or memory types.

Memory 112 may store or otherwise include various computer readable code segments, such as may form applications, operating systems, files, electronic documents, content, etc. For example, memory 112 of the illustrated embodiment comprises computer readable code segments defining Transport Accelerator (TA) 120 and UA 129, which when executed by a processor (e.g., processor 111) provide logic circuits operable as described herein. The code segments stored by memory 112 may provide applications in addition to the aforementioned TA 120 and UA 129. For example, memory 112 may store applications such as a browser, useful in accessing content from server 130 according to embodiments herein. Such a browser can be a web browser, such as a hypertext transfer protocol (HTTP) web browser for accessing and viewing web content and for communicating via HTTP with server 130 over connections 151 and 152, via network 150, if server 130 is a web server. As an example, an HTTP request can be sent from the browser in client device 110, over connections 151 and 152, via network 150, to server 130. A HTTP response can be sent from server 130, over connections 152 and 151, via network 150, to the browser in client device 110.

UA 129 is operable to request and/or receive content from a server, such as server 130. UA 129 may, for example, comprise a client application or process, such as a browser, a DASH client, a HTTP Live Streaming (HLS) client, etc., that requests data, such as multimedia data, and receives the requested data for further processing and possibly for display on a display of client device 110. For example, client device 110 may execute code comprising UA 129 for playing back media, such as a standalone media playback application or a browser-based media player configured to run in an Internet browser. In operation according to embodiments, UA 129 decides which fragments or sequences of fragments of a content file to request for transfer at various points in time during a streaming content session. For example, a DASH client configuration of UA 129 may operate to decide which fragment to request from which representation of the content (e.g., high resolution representation, medium resolution representation, low resolution representation, etc.) at each point in time, such as based on recent download conditions. Likewise, a web browser configuration of UA 129 may operate to make requests for web pages, or portions thereof, etc. Typically, the UA requests such fragments using HTTP requests.

TA 120 is adapted according to the concepts herein to provide enhanced delivery of fragments or sequences of fragments of desired content (e.g., the aforementioned content fragments as may be used in providing video streaming, file download, web-based applications, general web pages, etc.). TA 120 of embodiments is adapted to allow a generic or legacy UA (i.e., a UA which has not been predesigned to interact with the TA) that only supports a standard interface, such as a HTTP 1.1 interface implementing standardized TCP transmission protocols, for making fragment requests to nevertheless benefit from using the TA executing those requests. Additionally or alternatively, TA 120 of embodiments provides an enhanced interface to facilitate providing further benefits to UAs that are designed to take advantage of the functionality of the enhanced interface. TA 120 of embodiments is adapted to execute fragment requests in accordance with existing content transfer protocols, such as using TCP over a HTTP interface implementing standardized TCP transmission protocols, thereby allowing a generic or legacy media server (i.e., a media server which has not been predesigned to interact with the TA) to serve the requests while providing enhanced delivery of fragments to the UA and client device.

In providing the foregoing enhanced fragment delivery functionality, TA 120 of the embodiments herein comprises architectural components and protocols as described herein. For example, TA 120 of the embodiment illustrated in FIG. 1A comprises Request Manager (RM) 121 and Connection Manager (CM) 122 which cooperate to provide various enhanced fragment delivery functionality, as described further below.

In addition to the aforementioned code segments forming applications, operating systems, files, electronic documents, content, etc., memory 112 may include or otherwise provide various registers, buffers, and storage cells used by functional blocks of client device 110. For example, memory 112 may comprise a play-out buffer, such as may provide a first-in/first-out (FIFO) memory for spooling data of fragments for streaming from server 130 and playback by client device 110.

Processor 111 of embodiments can be any general purpose or special purpose processor capable of executing instructions to control the operation and functionality of client device 110. Although shown as a single element, processor 111 may comprise multiple processors, or a distributed processing architecture.

I/O element 113 can include and/or be coupled to various input/output components. For example, I/O element 113 may include and/or be coupled to a display, a speaker, a microphone, a keypad, a pointing device, a touch-sensitive screen, user interface control elements, and any other devices or systems that allow a user to provide input commands and receive outputs from client device 110. Any or all such components may be utilized to provide a user interface of client device 110. Additionally or alternatively, I/O element 113 may include and/or be coupled to a disk controller, a network interface card (NIC), a radio frequency (RF) transceiver, and any other devices or systems that facilitate input and/or output functionality of client device 110.

In operation to access and play streaming content, client device 110 communicates with server 130 via network 150, using links 151 and 152, to obtain content data (e.g., as the aforementioned fragments) which, when rendered, provide playback of the content. Accordingly, UA 129 may comprise a content player application executed by processor 111 to establish a content playback environment in client device 110. When initiating playback of a particular content file, UA 129 may communicate with a content delivery platform of server 130 to obtain a content identifier (e.g., one or more lists, manifests, configuration files, or other identifiers that identify media segments or fragments, and their timing boundaries, of the desired content). The information regarding the media segments and their timing is used by streaming content logic of UA 129 to control requesting fragments for playback of the content.

Server 130 comprises one or more systems operable to serve desired content to client devices. For example, server 130 may comprise a standard HTTP web server operable to stream content to various client devices via network 150. Server 130 may include a content delivery platform comprising any system or methodology that can deliver content to user device 110. The content may be stored in one or more databases in communication with server 130, such as database 140 of the illustrated embodiment. Database 140 may be stored on server 130 or may be stored on one or more servers communicatively coupled to server 130. Content of database 140 may comprise various forms of data, such as video, audio, streaming text, and any other content that can be transferred to client device 110 over a period of time by server 130, such as live webcast content and stored media content.

Database 140 may comprise a plurality of different source or content files and/or a plurality of different representations of any particular content (e.g., high resolution representation, medium resolution representation, low resolution representation, etc.). For example, content file 141 may comprise a high resolution representation, and thus high bit rate representation when transferred, of a particular multimedia compilation while content file 142 may comprise a low resolution representation, and thus low bit rate representation when transferred, of that same particular multimedia compilation. Additionally or alternatively, the different representations of any particular content may comprise a Forward Error Correction (FEC) representation (e.g., a representation including redundant encoding of content data), such as may be provided by content file 143. A Uniform Resource Locator (URL), Uniform Resource Identifier (URI), and/or Uniform Resource Name (URN) is associated with all of these content files according to embodiments herein, and thus such URLs, URIs, and/or URNs may be utilized, perhaps with other information such as byte ranges, for identifying and accessing requested data.

Network 150 can be a wireless network, a wired network, a wide area network (WAN), a local area network (LAN), or any other network suitable for the transfer of content as described herein. In an embodiment, network 150 can comprise at least portions of the Internet. Client device 110 can be connected to network 150 over a bi-directional connection, such as is represented by network connection 151. Alternatively, client device 110 can be connected via a uni-directional connection, such as that provided by a Multimedia Broadcast Multimedia System (MBMS) enabled network (e.g., connections 151, 152 and network 150 may comprise a MBMS network, and server 130 may comprise a Broadcast Multicast Service Center (BM-SC) server). The connection can be a wired connection or can be a wireless connection. In an embodiment, connection 151 can be a wireless connection, such as a cellular 4G connection, a wireless fidelity (WiFi) connection, a Bluetooth connection, or another wireless connection. Server 130 can be connected to network 150 over a bi-directional connection, such as represented by network connection 152. Server 130 can be connected to network 150 over a uni-directional connection (e.g. a MBMS network using protocols and services as described in 3GPP TS.26.346 or an ATSC 3.0 network). The connection can be a wired connection or can be a wireless connection.

Client device 110 of the embodiment illustrated in FIG. 1A comprises TA 120 operable to provide enhanced delivery of fragments or sequences of fragments of desired content according to the concepts herein. As discussed above, TA 120 of the illustrated embodiment comprises RM 121 and CM 122 which cooperate to provide various enhanced fragment delivery functionality. Interface 124 between UA 129 and RM 121 and interface 123 between RM 121 and CM 122 of embodiments provide an HTTP-like connection. For example, the foregoing interfaces may employ standard HTTP protocols as well as including additional signaling (e.g., provided using signaling techniques similar to those of HTTP) to support certain functional aspects of enhanced fragment delivery according to embodiments herein.

Figure 1B:
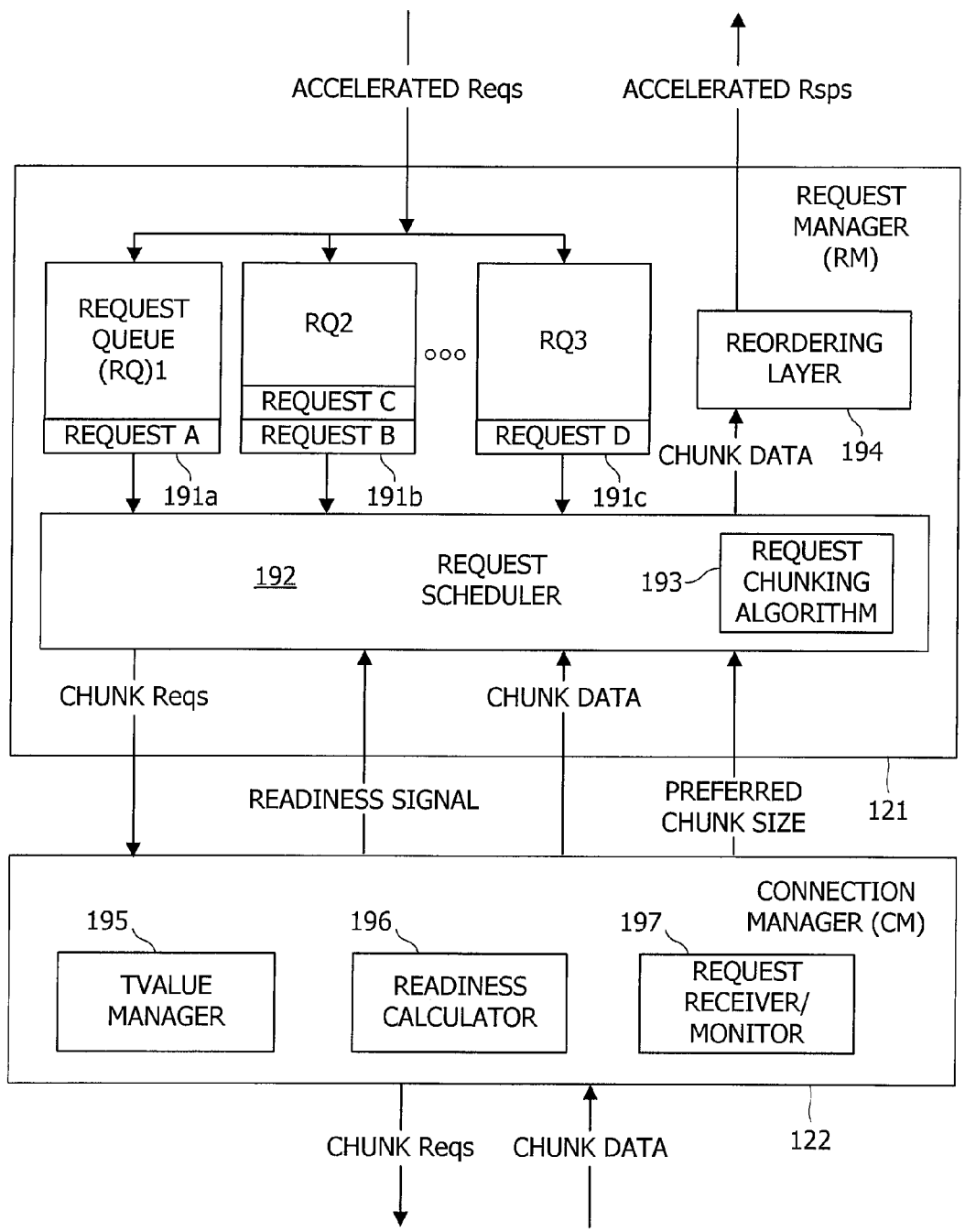
FIG. 1B shows detail with respect to embodiments of a request manager and connection manager as may be implemented with respect to configurations of a transport accelerator according to embodiments of the present disclosure.

FIG. 1B shows detail with respect to embodiments of RM 121 and CM 122 as may be implemented with respect to configurations of TA 120 as illustrated in FIG. 1A. In particular, RM 121 is shown as including request queues (RQs) 191a-191c, request scheduler 192 (including request chunking algorithm 193), and reordering layer 194. CM 122 is shown as including Tvalue manager 195, readiness calculator 196, and request receiver/monitor 197. It should be appreciated that, although particular functional blocks are shown with respect to the embodiments of RM 121 and CM 122 illustrated in FIG. 1B, additional or alternative functional blocks may be implemented for performing functionality according to embodiments as described herein.

RQs 191*a*-191*c* are provided in the embodiment of RM 121 illustrated in FIG. 1B to provide queuing of requests received by TA 120 by one or more UAs (e.g., UA 129). The different RQs of the plurality of RQs shown in the illustrated embodiment may be utilized for providing queuing with respect to various requests. For example, different ones of the RQs may each be associated with different levels of request priority (e.g., live streaming media requests may receive highest priority, while streaming media receives lower priority, and web page content receives still lower priority). Similarly, different ones of the RQs may each be associated with different UAs, different types of UAs, etc. It should be appreciated that, although three such queues are represented in the illustrated embodiment, embodiments herein may comprise any number of such RQs.

Request scheduler 192 of embodiments implements one or more scheduling algorithms for scheduling fragment requests and/or chunk requests in accordance with the concepts herein. For example, logic of request scheduler 192 may operate to determine whether the RM is ready for a fragment request from a UA based upon when the amount of data received or requested but not yet received for a fragment currently being requested by the RM falls below some threshold amount, when the RM has no already received fragment requests for which the RM can make another chunk request, etc. Additionally or alternatively, logic of request scheduler 310 may operate to determine whether a chunk request is to be made to provide an aggregate download rate of the connections which is approximately the maximum download rate possible given current network conditions, to result in the amount of data buffered in the network is as small as possible, etc. Request scheduler 310 may, for example, operate to query the CM for chunk request readiness, such whenever the RM receives a new data download request from the UA, whenever the RM successfully issues a chunk request to the CM to check for continued readiness to issue more requests for the same or different origin servers, whenever data download is completed for an already issued chunk request, etc.

In operation according to embodiments, request scheduler 192 may use a credit system (e.g., to maintain logical credits associated with each request queue of RQ 191*a*-191*c*) for selecting the next RQ from which to issue the next chunk request. With every new chunk request issued, the request scheduler may add a certain amount of credits to the existing credit associated with each RQ, as well as subtract a certain amount of credits to the existing credit associated with the RQ from which the new chunk request is generated. Additionally or alternatively, request scheduler 192 of embodiments may take into consideration the priority of each RQ when selecting the next RQ from which the next chunk request will be issued. Likewise, request scheduler 192 may monitor the size of a reorder buffer (e.g., the amount of data buffered from partial or full responses to the chunk requests associated with each request queue of RQ 191*a*-191*c*), whereby the request scheduler may operate to throttle back or stop issuing chunk requests from a given RQ when the amount of buffered data associated with that RQ in the reorder buffer exceeds certain threshold. Request scheduler 192 of embodiments may operate to resume normal request issuing from that RQ when the amount of buffered data falls below a threshold.

Request scheduler 192 of the illustrated embodiment is shown to include fragment request chunking functionality in the form of request chunking algorithm 193. Request chunking algorithm 193 of embodiments provides logic utilized to subdivide requested fragments to provide a plurality of corresponding smaller data requests. The above referenced patent application entitled "TRANSPORT ACCELERATOR IMPLEMENTING REQUEST MANAGER AND CONNECTION MANAGER FUNCTIONALITY" provides additional detail with respect to computing an appropriate chunk size according to embodiments as may be implemented by request chunking algorithm 193.

Reordering layer 194 of embodiments provides logic for reconstructing the requested fragments from the chunks provided in response to the aforementioned chunk requests. It should be appreciated that the chunks of data provided in response to the chunk requests may be received by TA 120 out of order, and thus logic of reordering layer 194 may operate to reorder the data, perhaps making requests for missing data, to thereby provide requested data fragments for providing to the requesting UA(s).

Tvalue manager 195 of the illustrated embodiment of CM 122 provides logic for determining and/or managing one or more parameters (e.g., threshold parameter, etc.) for providing control with respect to chunk requests (e.g., determining when a chunk request is to be made). Similarly, readiness calculator 196 of the illustrated embodiment of CM 122 provides logic for determining and/or managing one or more parameters (e.g., download rate parameters) for providing control with respect to chunk requests (e.g., signaling readiness for a next chunk request between CM 122 and RM 121). Detail with respect to the calculation of such parameters and their use according to embodiments is provided in the above reference patent application entitled "TRANSPORT ACCELERATOR IMPLEMENTING REQUEST MANAGER AND CONNECTION MANAGER FUNCTIONALITY".

Request receiver/monitor 197 of embodiments provides logic operable to manage chunk requests. For example, request receiver/monitor 197 may operate to receive chunk requests from RM 121, to monitor the status of chunk requests made to one or more content servers, and to receive data chunks provided in response to the chunk requests.

Figure 2:
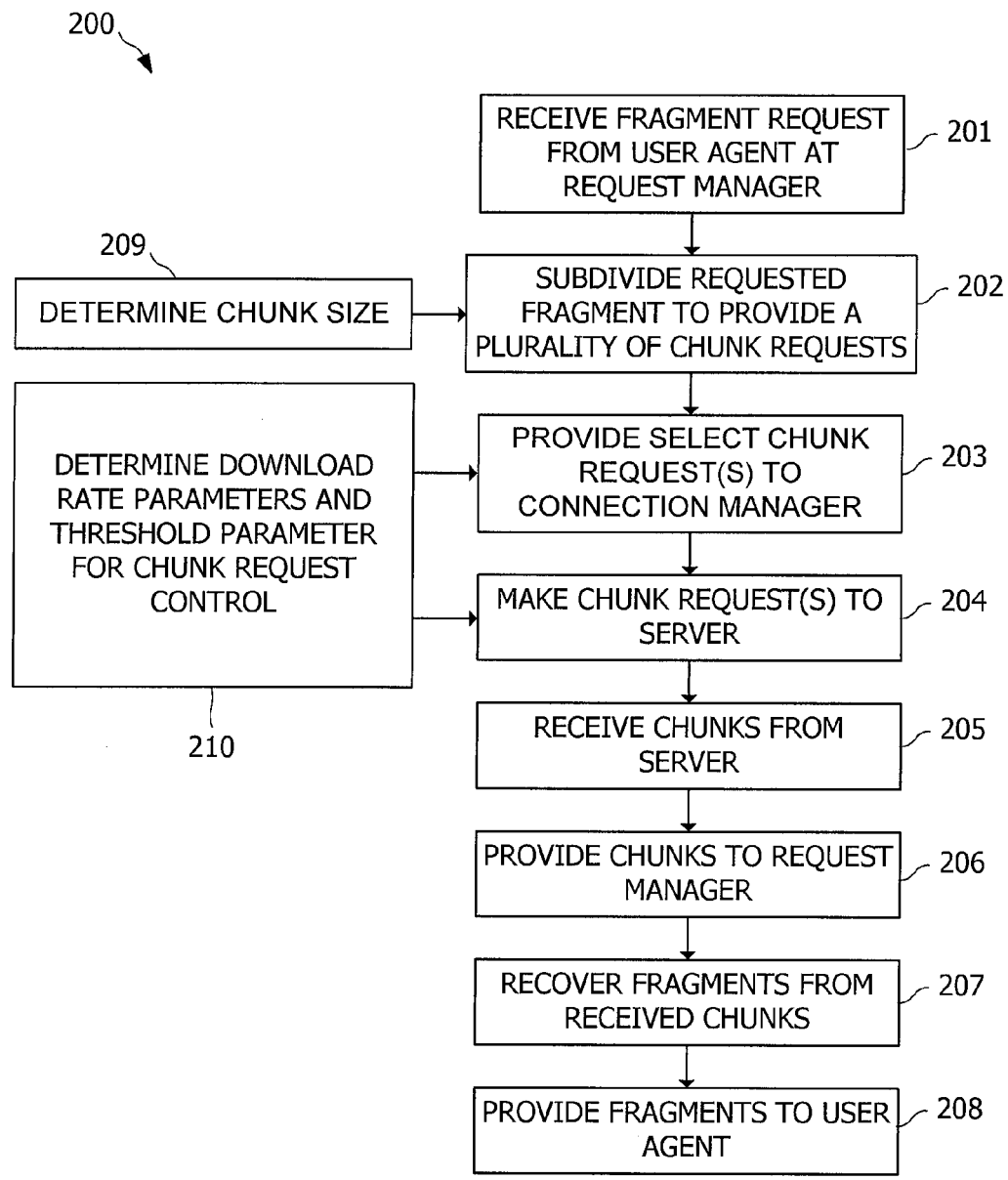
FIG. 2 shows a flow diagram illustrating operation of a Transport Accelerator providing Request Manager and Connection Manager functionality according to embodiments of the present disclosure.

In operation according to embodiments, as illustrated by flow 200 of FIG. 2, RM 121 receives requests for fragments from UA 129 (block 201). In accordance with embodiments herein, RM 121 is adapted to receive and respond to fragment requests from a generic or legacy UA (i.e., a UA which has not been predesigned to interact with the RM), thereby providing compatibility with such legacy UAs. Accordingly, RM 121 may operate to isolate UA 129 from the extended transmission protocol operation of TA 120. However, as will be more fully understood from the discussion which follows, UA 129 may be adapted for extended transmission protocol operation, whereby RM 121 and UA 129 cooperate to implement one or more features of the extended transmission protocol operation, such as through the use of signaling between RM 121 and UA 129 for implementing such features.

In operation according to embodiments, request receiver/monitor 197 may collect statistics regarding the download time and/or download rate associated with each chunk request and use such statistics to determine whether a chunk request being downloaded is too slow. When a chunk request download is considered slow (e.g., slower than a certain threshold), request receiver/monitor 197 may issue one or more chunk requests for the unreceived portion of the slow-progressing chunk request. In addition, request receiver/monitor 197 may cancel the slow-progressing chunk request, and may optionally close the underlying transport connection (e.g., using either transmission control protocol, or extended transmission protocol) that is used for the slow-progressing chunk request and open a new connection.

Figure 1C:
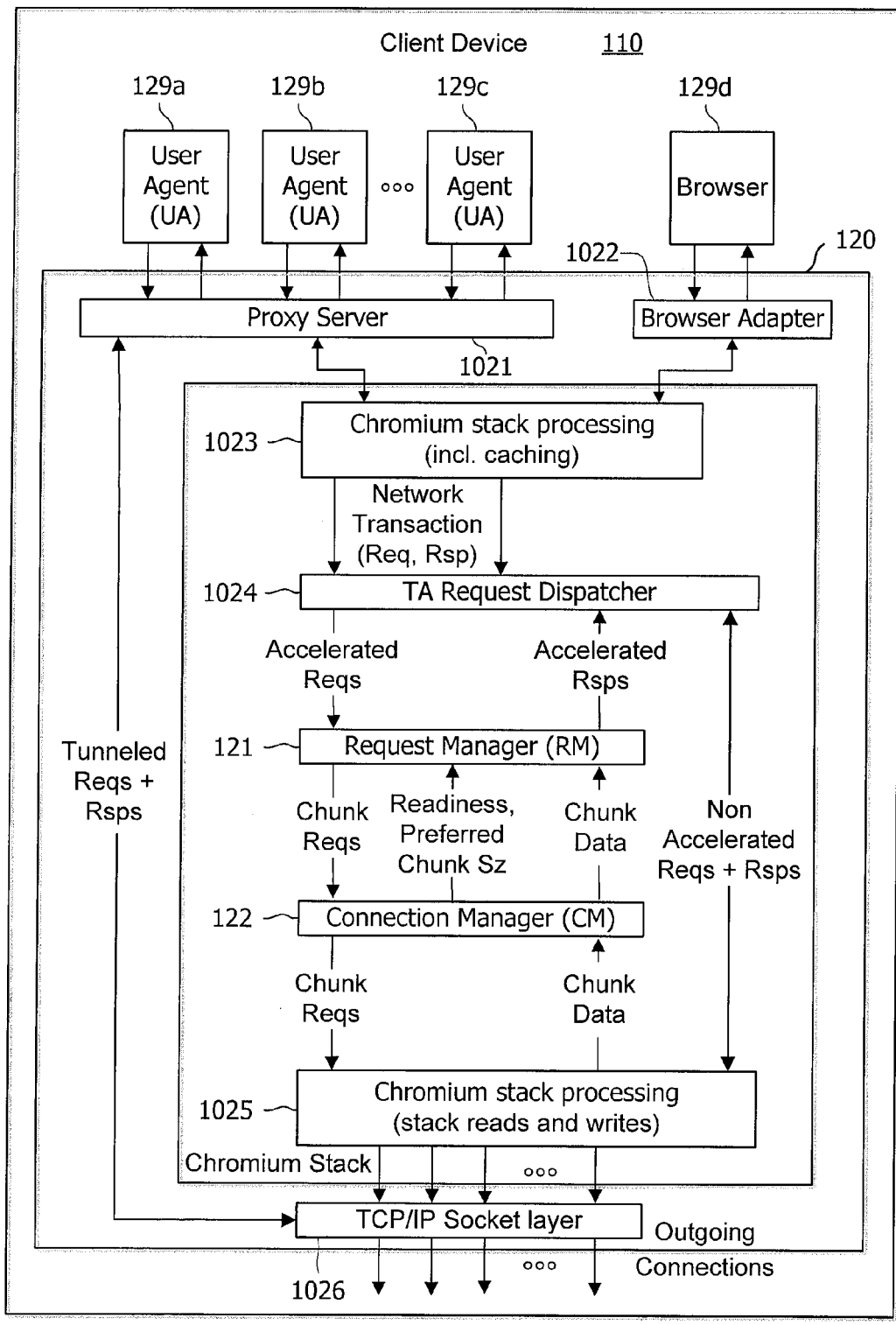
FIG. 1C shows detail with respect to a Transport Accelerator configuration according to embodiments of the present disclosure.

FIG. 1C shows further detail with respect to a Transport Accelerator configuration of embodiments. The exemplary embodiment of FIG. 1C comprises a configuration of TA 120 adapted to facilitate Transport Accelerator proxy operation with respect to client device 110. The embodiment of TA 120 illustrated in FIG. 1C includes RM 121 and CM 122 operable to generate chunk requests and manage the requests made to one or more servers for desired content, as described herein. Moreover, TA 120 of the illustrated embodiment includes additional functionality facilitating proxied transport accelerator operation on behalf of one or more UAs according to the concepts herein. For example, TA 120 is shown to include proxy server 1021 providing a proxy server interface with respect to UAs 129*a*-129*c*. TA 120 of the illustrated embodiment is also shown to include browser adapter 1022 providing a web server interface with respect to UA 129*d*, wherein UA 129*d* is shown as a browser type user agent (e.g., a HTTP web browser for accessing and viewing web content and for communicating via HTTP with web servers). In addition to the aforementioned functional blocks providing a proxy interface with respect to UAs, the embodiment of TA 120 illustrated in FIG. 1C is shown including additional functional blocks useful in facilitating accelerated transport of content according to the concepts herein. In particular, TA 120 is shown as including stack processing 1023, TA request dispatcher 1024, stack processing 1025, and socket layer 1026. Further detail with respect to embodiments of TA proxy configurations is provided in the above referenced patent application entitled "TRANSPORT ACCELERATOR IMPLEMENTING A MULTIPLE INTERFACE ARCHITECTURE."

TA 120 of embodiments implements data transfer requesting portions of content that are typically smaller than the content fragments requested by the UA. Accordingly, RM 121 of embodiments operates to subdivide requested fragments (block 202) to provide a plurality of corresponding smaller data requests (referred to herein as "chunk requests" wherein the requested data comprises a "chunk"). The size of chunks requested by TA 120 of embodiments is typically less than the size of the fragment requested by UA 129. Thus, each fragment request from UA 129 may trigger RM 121 to generate and make multiple chunk requests to CM 122 to recover that fragment. Such chunk requests may comprise some form of content identifier (e.g., URL, URI, URN, etc.) of a data object comprising the fragment content, or some portion thereof, perhaps with other information, such as a byte ranges comprising the desired content chunk, whereby the chunks aggregate to provide the requested fragment.

The size of the chunks requested by TA 120 may be based upon any of a number of considerations. Generally, CM 122 may determine target chunk sizes or information relevant to chunk size selection and provide these to RM 121, and RM 121 uses the provided target chunk sizes or information relevant to chunk size selections to determine the actual chunk sizes into which fragments are partitioned. CM 122 provide a target chunk size or information relevant to chunk size selections to RM 121 when CM 122 signals that it is ready for another chunk request. Accordingly, the illustrated embodiment of flow 200 provides for RM 121 determining the chunk size at block 209, such as based on a target chunk size or information relevant to chunk size selections provided by CM 122 to RM 121. CM 122 of embodiments may implement one or more algorithms for determining a target size of chunks to be requested or determining information relevant to chunk size selections. In operation according to such an embodiment, CM 122 may signal to RM 121 the target size of chunk requests that are suitable for the transport that the CM is providing, and the RM can use the supplied target sizes to determine that actual chunk sizes when it is forming requests to make to the CM based on fragment requests received from the UA.

As one example of operation to determine chunk size, for a given connection over which the next chunk request can be made, the CM may have the exact or approximate size of the amount of data, W, that server 130 can immediately send over that connection (it being appreciated that the chunk size in this example is independent of fragment size and even the fragment assembly algorithms that may be used by the RM). CM 122 may, for example, determine an appropriate target chunk size for the next chunk request, such as a target chunk request size at the minimum of W and Cmax, where Cmax is an upper bound on the desired chunk size request (e.g., Cmax may be a predetermined maximum size of the content chunks of the chunk requests, wherein fragments are partitioned into chunk requests that are of size less than or equal to the maximum size). A reason for setting the desired target chunk request size in this way is that as soon as the server receives request of this size over that connection, the server can immediately send the entire response over that connection. Where all the chunk request sizes are selected in this way when making requests to the server, and if all packets sent from the server to the CM are received and received in order, then all data requested by the CM will arrive in order of when the CM made the requests, even when the CM is requesting the data over multiple connections.

It should be appreciated, however, that a choice of chunk size for any particular situation may depend on various aspects of the system, although the chunk size may nevertheless be set so that the ratio of the uplink traffic to make the requests is in acceptable proportion to the amount of downlink traffic provided in response to the requests. When the CM can pipeline requests (e.g., pipelining several HTTP requests on a single TCP connection), then a relatively small chunk size may be satisfactory. In such a case, logic of CM 122 may operate to select a relatively small target chunk size, wherein the target chunk size is nevertheless large enough so that the request and response header overhead per chunk does not become prohibitive. When pipelining is not supported or allowed, or when only a limited amount of pipelining is supported or allowed, logic of CM 122 may operate to select a larger target chunk size, because otherwise it may not be possible to make use of the full link capacity (e.g., the target chunk size may be selected so that the product of the number of connections used and the chunk size exceeds the bandwidth-delay product (BDP) in this case).

Chunk sizes as implemented according to embodiments may ideally be selected so as to be proportional to or at least smaller than the congestion window for the connection (e.g., TCP connection) used in transporting the data chunk. TA 120 of embodiments, however, is implemented at the receiver side (e.g., client device 110) and thus generally does not have congestion window information. Logic of TA 120 may nevertheless operate to determine an approximation of the congestion window with respect to any particular connection. For example, TA 120 of embodiments may operate to simulate TCP sender behavior, at the receiver, in order to estimate the congestion window for a connection as experienced by server 130.

The following provides an exemplary technique for computing the chunk size, as may be implemented by logic of CM 122 and RM 121 of embodiments herein. CM 122 may provide the following information relevant to chunk size selection to RM 121 according to this technique:

| Parameter | Meaning |
|---|---|
| Cmin | Target minimum chunk size (e.g., 8 KB) establishing a minimum size of the content chunks of the chunk requests, wherein fragments of a size less than the minimum size are requested using one chunk request. |
| Cmax | Target maximum chunk size (e.g., 32 KB or 64 KB) establishing a maximum size of the content chunks of the chunk requests, wherein fragments are partitioned into chunk requests that are of size less than or equal to the maximum size. |
| N | Target minimum number of chunks per fragment (may, for example, be set to target number of connections, e.g., 8) |

Based on this information relevant to chunk size selection, RM 121 may determine the number of chunks, P, to partition a fragment of size F into, whereby the fragment is partitioned into P chunks of as equal size as possible (e.g., using the partition function specified in IETF RFC 5053 or IETF RFC 6330), may then be computed. For example, RM 121 may compute the chunk size using the foregoing parameters as shown below:

Pmax = max { 1, floor(F/Cmin) }
Pmin = max { 1, floor (F/Cmax) }
P = max { Pmin, min { Pmax , N } } (equivalently, P = min { Pmax, max { Pmin, N} })

The foregoing technique for determining chunk size ensures that the minimum chunk size is at least min {F, Cmin} when F is divided into P equal size chunks. The chunk size computed using such a technique is particularly well suited for use in situations where the CM can use pipelining (e.g., HTTP pipelining) to its fullest extent.

When the CM cannot use pipelining, a different method of computing chunk sizes may be utilized according to embodiments. For example, CM 122 may determine a target chunk size T dynamically and provide T to RM 121 when for example CM 122 signals to RM 121 that the CM is ready for another chunk request. The value of T at each point in time may be based on a number of factors, including current network conditions, current download speeds, and other metrics as described elsewhere herein.

RM 121 may use the value of T received from CM 122 of embodiments to compute the chunk size of the next request as shown below, wherein N is the number of unrequested bytes in the fragment from which RM 121 is to generate the next chunk request:
ChunkSize:=min(N, T)

In operation according to embodiments, it may not be desirable to make all the chunks the same size. For example, embodiments may utilize a smaller chunk size when initially sending requests to a server and, over time, increase the size of the chunks request (e.g., the congestion window for a connection typically increases over time, and thus the chunk size may be increased in accordance with this expectation). By initially using a smaller chunk size, TA 120 may experience desired responsiveness with respect to data transfer at the beginning of a streaming session and thereafter, by increasing the chunk size, obtain a better tradeoff between the uplink and downlink bandwidth utilization.

The use of chunks of all the same size may likewise be undesirable because the use of such a homogeneous chunk size may lead to all the connections between the TA and server being idle at the same time, thereby resulting in inefficient channel use. Moreover, in a situation wherein very small chunks are requested (e.g., due to N being small), it may be desirable for the previous chunk request to be larger. The following technique is adapted to address the foregoing considerations using the parameters below for computing chunk size by RM 122:

| Parameter | Meaning |
|---|---|
| I | Counter, reused every time a new request is made. Starts with I = 0. |
| X | Fixed hysteresis parameter, e.g. X = 1.5. |
| A | Fixed spread width factor, e.g. A = 0.5 |
| N | Number of unrequested bytes in current fragment |

The chunk size may be computed by RM 122 using the foregoing parameters as shown below:

$P = T * (1 + A*revbits(I)/2^{32})$
If $P * X > N$, set ChunkSize := P
Else, set ChunkSize := N
$I = (I + 1) \mod 2^{32}$ In the above computation, revbits(I) is the value generated when I is represented as a 32-bit value, the 32 bits of I are listed in the reverse order, and then the reversed 32-bits are treated as an integer value. For example, if I=7, then I represented as a 32-bit value is 00000000000000000000000000000111 and thus revbits (I) is the integer value of 11100000000000000000000000000000, which is 3,758, 096,384 and thus revbits $(7)/2^{32}$=0.875. It should be appreciated that chunk size determinations, as may be made according to embodiments herein, may be performed a priori with respect to one or more content transfer sessions (e.g., streaming media session), contemporaneous with initiation of a content transfer session, dynamically during one or more content transfer sessions, etc., and combinations thereof. Accordingly, determining chunk sizes as performed at block 209 of FIG. 2 may be performed, such as by implementing one or more of the foregoing techniques, at various times with respect to the other operations represented in flow 200.

Moreover, although embodiments have been described herein with reference to interoperability of logic of CM 122 and RM 121 to make chunk size determinations, embodiments may utilize other logic for chunk size determinations. For example, embodiments may determine chunk sizes solely within CM 122, or solely within RM 121, or use other modules or logic or information to determine chunk sizes. For example, RM 121 may utilize download statistics, as may be provided by CM 122, to dynamically determine chunk sizes for the various chunk requests.

Irrespective of the timing of the chunk size determinations and where logic for making the determinations may be deployed, RM 121 of embodiments operates to determine what data to request from CM 122 to reliably receive and recover requested fragments. Accordingly, RM 121 of embodiments provides one or more selected chunk requests, as may be associated with one or more fragment requests made by UA 129, to CM 122 from time to time (block 203 of FIG. 2).

In operation according to embodiments, RM 121 may receive chunk readiness signaling from CM 122 indicating that the CM is ready to make a next chunk request. For example, TA 120 (e.g., CM 122) may implement logic for determining one or more parameters (e.g., download rate parameters, threshold parameter, etc.) for providing control with respect to chunk requests (e.g., determining when a chunk request is to be made and/or signaling readiness for a next chunk request between CM 122 and RM 121), as shown by block 210 of the illustrated embodiment. Detail with respect to the calculation of such parameters and their use according to embodiments is provided below.

Some of the chunk requests made by RM 121 to CM 122 may be for data already requested that has not yet arrived, and which RM 121 has deemed may never arrive or may arrive too late. Additionally or alternatively, some of the chunk requests made by RM 121 to CM 122 may be for FEC encoded data generated from the original fragment, whereby RM 121 may FEC decode the data received from CM 122 to recover the fragment, or some portion thereof. RM 121 delivers recovered fragments to UA 129. Accordingly, there may be various configurations of RMs according to embodiments of the invention, such as may comprise a basic RM configuration (RM-basic) which does not use FEC data and thus only requests portions of data from the original source fragments and a FEC RM configuration (RM-FEC) which can request portions of data from the original source fragments as well as matching FEC fragments generated from the source fragments.

RM 121 of embodiments may be unaware of timing and/or bandwidth availability constraints, thereby facilitating a relatively simple interface between RM 121 and CM 122, and thus RM 121 may operate to make chunk requests without consideration of such constraints by RM 121. Alternatively, RM 121 may be adapted for awareness of timing and/or bandwidth availability constraints, such as may be supplied to RM 121 by CM 122 or other modules within client device 110, and thus RM 121 may operate to make chunk requests based upon such constraints.

RM 121 of embodiments is adapted for operation with a plurality of different CM configurations. Moreover, RM 121 of some embodiments may interface concurrently with more than one CM, such as to request data chunks of the same fragment or sequence of fragments from a plurality of CMs. Each such CM may, for example, support a different network interface (e.g., a first CM may have a local interface to an on-device cache, a second CM may use HTTP/TCP connections to a 3G network interface, a third CM may use HTTP/TCP connections to a 4G/LTE network interface, a fourth CM may use HTTP/TCP connections to a WiFi network interface, etc.).

In operation according to embodiments CM 122 interfaces with RM 121 to receive chunk requests, and sends those requests over network 150 (block 204 of FIG. 2). CM 122 receives the responses to the chunk requests (block 205) and passes the responses back to RM 121 (block 206), wherein the fragments requested by UA 129 are resolved from the received chunks by RM 121 (block 207) and provided to UA 129 (block 208). Functionality of CM 122 operates to decide when to request data of the chunk requests made by RM 121. In accordance with embodiments herein, CM 122 is adapted to request and receive chunks from generic or legacy servers (i.e., a server which has not been predesigned to interact with the CA). For example, the server(s) from which CM 122 requests the data may comprise standard HTTP web servers. Alternatively, the server(s) from which CM 122 receives the data may comprise BM-SC servers used in MBMS services deployment.

As with RM 121 discussed above, there may be various configurations of CMs according to embodiments of the invention. For example, a multiple connection CM configuration (e.g., CM-mHTTP) may be provided whereby the CM is adapted to use HTTP over multiple TCP connections. A multiple connection CM configuration may operate to dynamically vary the number of connections (e.g., TCP connections), such as depending upon network conditions, demand for data, congestion window, etc. As another example, an extended transmission protocol CM configuration (e.g., CM-xTCP) may be provided wherein the CM uses HTTP on top of an extended form of a TCP connection (referred to herein as xTCP). Such an extended transmission protocol may provide operation adapted to facilitate enhanced delivery of fragments by TA 120 according to the concepts herein. For example, an embodiment of xTCP provides acknowledgments back to the server even when sent packets are lost (in contrast to the duplicate acknowledgement scheme of TCP when packets are lost). Such a xTCP data packet acknowledgment scheme may be utilized by TA 120 to avoid the server reducing the rate at which data packets are transmitted in response to determining that data packets are missing. As still another example, a proprietary protocol CM configuration (e.g., CM-rUDP) wherein the CM uses a proprietary User Datagram Protocol (UDP) protocol and the rate of sending response data from a server may be at a constant preconfigured rate, or there may be rate management within the protocol to ensure that the send rate is as high as possible without undesirably congesting the network. Such a proprietary protocol CM may operate in cooperation with proprietary servers that support the proprietary protocol.

It should be appreciated that, although the illustrated embodiment has been discussed with respect to CM 122 requesting data from a source file from server 130, the source files may be available on servers or may be stored locally on the client device, depending on the type of interface the CM has to access the data. In some embodiments, FEC files that contain repair symbols generated using FEC encoding from the matching source files may also be available on the servers. In such embodiments there may, for example, be one FEC file for each source file, wherein each FEC file is generated from the source file using FEC encoding techniques known in the art independent of the particular embodiment of CM used to request the data.

Further, in accordance with embodiments, client device 110 may be able to connect to one or more other devices (e.g., various configurations of devices disposed nearby), referred to herein as helper devices (e.g., over a WiFi or Bluetooth interface), wherein such helper devices may have connectivity to one or more servers, such as server 130, through a 3G or LTE connection, potentially through different carriers for the different helper devices. Thus, client device 110 may be able to use the connectivity of the helper devices to send chunk requests to one or more servers, such as server 130. In this case, there may be a CM within TA 120 to connect to and send chunk requests and receive responses to each of the helper devices. In such an embodiment, the helper devices may send different chunk request for the same fragment to the same or different servers (e.g., the same fragment may be available to the helper devices on multiple servers, where for example the different servers are provided by the same of different content delivery network providers).

Embodiments have been described above wherein a plurality of chunk requests are made, such as using a data object identifier (e.g., URL, URI, URN, etc.) and byte range within the data object for the chunk content, for transferring a desired fragment of content as a plurality of chunks. Some content server (e.g., server 130) configurations may, however, not support such byte range requests, and thus may operate to return the complete data object in response to a chunk request rather than the chunk of content of the byte range. Accordingly, if the plurality of chunk requests were nevertheless made, multiple instances of the full data object would be transferred to the client device. Embodiments of the Transport Accelerator herein operate to detect if byte range requests are supported by a server operating as a source of content. For example, TA 120 of embodiments may initially issue a HTTP byte range request and analyze a response code to determine whether byte range requests are supported (e.g., receiving a 206 response code may be utilized to determine byte range requests are supported, whereas receiving a 200 response code may be utilized to determine byte range requests are not supported). If byte range requests are determined to be supported (e.g., an HTTP 206 is received in response to one or more chunk requests sent to a host (origin) server) then TA 120 may continue to proceed with its logic to partition fragment requests into chunk requests for sending to that host server. However, if byte range requests are determined not to be supported by a host server (e.g., an HTTP 200 is received in response to one or more chunk requests sent to that host (origin) server) then the TA 120 may cancel all outstanding requests which specified a byte range sent to that host server. Where it is determined that a server does not support byte range requests (e.g., the server is not HTTP 1.1 compliant), TA 120 may operate to modify its operation so as to avoid the use of a plurality of chunk requests which would result in multiple instances of a same data object being transferred. For example, RM 121 may operate to make requests for the full data objects (e.g., content files) of CM 122, whereby CM 122 correspondingly requests the full files from server 130. Although such operation may not provide optimum performance as compared to Transport Accelerator operation wherein chunk requests are supported, in the situation where the content server does not support byte range requests such operation avoids duplicative transfer of content.

It should be appreciated that even where byte range requests are supported, optimum performance may not result due to various client device and/or server configurations. For example, the size of the chunk requests made by CM 122 to server 130 may be quite small and the communications protocols implemented with respect to a connection over which such chunk requests are made may implement certain techniques for improving the network efficiency by reducing the number of packets that are sent over the network. Such techniques may undesirably impact (e.g., delay) chunk requests herein. For example, Nagle's algorithm may be implemented with respect to TCP connections to provide combining of a number of small outgoing messages, and sending them all at once (e.g., as long as there is a sent packet for which the sender has received no acknowledgment, the sender may keep buffering its output until it has a full packet's worth of output, so that output can be sent all at once). Although generally improving network efficiency, operation of Nagle's algorithm may delay chunk requests. Such delay of chunk requests may result in an unacceptable user experience, such as by causing stalling in streaming content, impermissible delay in live streaming, etc. Accordingly, embodiments operate to disable network efficiency techniques, such as Nagle's algorithm, which operate to reduce the number of packets that are sent over the network.

Where byte range requests are supported by a content server, the client device may nevertheless not have information regarding the size of the content file and/or of the fragment to be requested. However, in order to provide advantages of transport acceleration according to embodiments herein, operation of TA 120 of embodiments makes requests for chunks of content as described above. In order to obtain information regarding the size of the content file, and thus the fragments thereof, TA 120 may operate to initially issue one or more small chunk requests (e.g., 16 KB requests) whereby the responses to those requests will contain the actual content size from the server. Logic of TA 120 (e.g., logic of RM 121 and/or CM 122) may thereafter use that information to determine how to divide up the fragments into chunks and to schedule the remaining requests. TA 120 of embodiments may operate in an alternative manner similar to the foregoing manner when the size of a content file is not known. For example, if TA 120 would make multiple chunk requests for a content file of known size, TA 120 may make a similar number of chunk requests with a similar timing of the requests when the size of the content file is not known at the time of the first chunk request. If the fragment size is not known, then RM 121 can assume the fragment size is infinite (or unbounded) until receiving a response from a chunk request with the size included. With this embodiment, there will potentially be chunk requests for byte ranges of the fragment that are beyond the end of the fragment. Thus, in accordance with embodiments the responses for chunk requests from a server that supports byte range requests can be: (a) HTTP 206 OK response, if there is a complete overlap between the requested byte range and the actual byte range of the fragment, and thus the byte range of the chunk request will be returned from the server in response: (b) HTTP 404 error response, if there is no overlap between the requested byte range in the chunk request and the actual byte range of the fragment, and no bytes of the fragment will be provided by the server in response: (c) an HTTP response that indicates that there is a partial overlap between the byte range in the chunk request and the byte range of the fragment, and the overlap between the byte range of the chuck request and the byte range of the fragment will be returned from the server in response. In some or all of these cases the response will also include the size of the fragment. Based on this information received in any of the responses RM 121 can set the actual size of the fragment for any further responses or handling.

From the foregoing it can be appreciated that RM 121 of embodiments is adapted to handle the possible responses to chunk requests of fragments of unknown size appropriately. For example, the HTTP responses with error codes or warnings should be handled seamlessly by RM 121 since the RM can determine that these responses were to be expected due to requesting invalid or partially invalid byte ranges of the fragment, which the RM can determine once the RM obtains the actual fragment size in a response.

The foregoing techniques for handling fragments of unknown size can work well in most circumstances. For example, the fragments are likely to be much longer than what is requested in single RTT for HTTP progressive download streaming and thus since the size of the fragment will be obtained in a response before the entire fragment is requested in chunk requests, generally all of the byte ranges in the chunk requests made before the fragment size is known will be valid byte ranges. Similarly, for DASH streaming, the playback time of fragments is likely to be several RTTs in duration, and thus the same analysis is valid except in the case when the download rate is much higher than the current playback rate, in which case there might be a few chunk requests sent with byte ranges that don't overlap the fragment, but this typically happens when the playback selected is significantly below the download rate in which case the impact of making chunk requests with byte ranges that do not overlap the fragment is significantly reduced.

Accordingly, the Transport Accelerator may operate to request content immediately, even where insufficient information is available to optimally implement chunk requests, and later use information as it is available to determine chunk sizes and schedule appropriate chunk requests.

As discussed above, a multiple connection CM configuration (e.g., CM-mHTTP) may be provided whereby the CM is adapted to use multiple connections for requesting and receiving content from one or more content servers according to the concepts herein. Where multiple connections are in use, a fairness aspect arises regarding how the CM enforces the different connections to be fair with one another (e.g., to ensure that the download rates of the connections stay reasonably close to one another, such as within a factor of two).

A relatively simple technique for providing a level of fairness with respect to multiple connections comprises an implementation in which the CM controls the receive window size of each of the connections. For example, CM 122 may set the receive window size of all TCP connections to be equal and to be large enough so that the available bandwidth can be approximately fully utilized by the TCP connections but not so large that some TCP connections at times download at a much faster rate than other TCP connections. Such an implementation may achieve approximately equal download rates for each such TCP connection.

An alternative technique for providing fairness with respect to multiple connections, which avoids controlling the receive window size, comprises an implementation adapted to control the amount of data requested but not yet delivered over each connection. An objective of this technique is to increase the aggregate download rate of the connections, to ensure that the connections are downloading at approximately the same rate, and to reduce the amount of data buffered in the network. Embodiments implementing this technique utilize one or more threshold parameters to decide when another chunk of data is to be requested on a particular connection of the multiple connections. The same value for the foregoing threshold parameter may be utilized with respect to each connection of the multiple connections according to embodiments. Alternative embodiments may utilize a different value with respect to one or more connections for the foregoing threshold parameter, if desired.

In accordance with embodiments of a connection fairness implementation that controls the amount of data requested but not yet delivered over each connection a threshold parameter, Thresh, is defined to be a number of octets, whose value the CM controls, and is used to decide when another chunk of data can be requested on a connection. For example, when the amount of requested but not yet received data on a TCP connection is below Thresh then another data chunk request can be made on that connection. However, if the amount of requested but not yet received data on a TCP connection is at or above Thresh then another data chunk request is not made on that TCP connection.

FIG. 3 illustrates operation according to an embodiment employing the threshold parameter, Thresh, for deciding when another chunk of data can be requested on a connection. In the illustrated example, it is assumed that the CM is ready for another chunk request on any particular connection when the amount of data left to receive for all current requests falls below Thresh. For example, CM 122 may comprise the aforementioned CM-mHTTP configuration and may be utilizing the three TCP connections as shown in FIG. 3, wherein the CM has already made HTTP chunk requests for data on all three connections such that the amount of remaining data to be received on each of the three TCP connections is still above the threshold amount, Thresh. In this scenario, the CM cannot currently make any more HTTP requests on any of these three connections. Accordingly, the CM is not ready for another chunk request from the RM, because even if the CM did receive another chunk request from the RM the CM could not immediately make a request for that chunk.

FIG. 4 illustrates operation according to an embodiment employing the threshold parameter, Thresh, to decide when the CM is currently able to immediately make a chunk request. In this example it is again assumed that CM 122 is ready for another chunk request on any particular connection when the amount of data left to receive for all current requests falls below a threshold amount, Thresh. In the example of FIG. 4, enough data has been received for at least one of the connections (e.g., TCP connection 2 and TCP connection 3) such that another request can be made.

An objective for the selection of a value of the threshold parameter, Thresh, is that the value be selected to be large enough that the aggregate download rate of the connections is approximately the maximum download rate possible given current network conditions, while at the same time being as small as possible so as to ensure that the different connections are downloading data at approximately the same rate and so that the amount of data buffered in the network is as small as possible. The value of Thresh can be determined dynamically based on the methods described herein when HTTP pipelining is used on individual TCP connections. Selecting a chunk size, C, to be as small as possible facilitates the foregoing. However, as previously discussed the chunk size should be large enough so that the overhead of requesting chunks is a small fraction of the download bandwidth used for receiving the chunk responses. For example, if C is set to 8 KB and HTTP requests are 200 bytes in size, then the relative overhead of chunk requests for this value of C is around 2.5%. This is a reasonable trade-off, given that the TCP acknowledgement traffic is typically a few percent of the TCP download traffic.

It should be appreciated that when pipelining is not implemented, although direct use of the foregoing threshold parameter as described above becomes problematic, threshold based algorithms may nevertheless be implemented for providing connection fairness herein. For example, where a fixed number N of TCP connections is being used, if each chunk request is of size Thresh, the total amount of outstanding bytes on the network will be at most N*Thresh. Thus, if the bandwidth-delay-product of the link to the server is large, a large value of Thresh may be desirable, whereas a small value of Thresh may be preferable if the bandwidth delay product is not large. It should be appreciated that, in such an implementation, the tradeoffs are generally the same as in the above described pipelined case (i.e., the value of the threshold parameter, Thresh, should be large enough to allow receiving data at rate close to the maximum possible, while kept small enough to avoid unnecessary buffering on the network). Compared to the pipelined case, however, the value of the threshold parameter, Thresh, in this non-pipelined example should be smaller by a factor of about N/2 to N.

Having generally described the use of threshold parameters for implementing fairness with respect to a plurality of connections utilized by a Transport Accelerator of embodiments herein, detail with respect to computing appropriate values of such threshold parameters is provided below. It should be understood that the techniques set forth below compute values of a threshold parameter, Thresh, in an iterative way, and may be applied to the pipelined and non-pipelined cases.

In operation according to embodiments, CM 122 dynamically and continually adjusts the value of Thresh based on current network conditions, because an optimum value for Thresh can vary according to network conditions. A plurality of download rate parameters (e.g., DR, DFR, and DCR) may be utilized in implementing a technique for determining the value of Thresh (e.g., operation at block 210 of FIG. 2) according to embodiments herein. Such download rate parameters provide a measure of how fast data, fragments of data, and/or chunks of data are being downloaded from the server to the client and may be determined by how many bytes have been received in a window of time. For example, DR (Download Rate) is defined as the aggregate average download rate (e.g., measured over a suitable window of time, or averaged using a weighted moving average) of the connections (e.g., TCP connections). DFR (Download Fragment Rate) is similarly defined as the aggregate average download rate of the connections, except that in the case of DFR the first packet of each fragment, and the time between reception of the first packet of a fragment and the reception of the preceding packet (from any fragment, over any of the TCP connections), is not included in the average (i.e., "discounted"). Likewise, DCR (Download Chunk Rate) is defined as the aggregate average download rate of the connections, except that in the case of DCR the first packet of each chunk, and the time between reception of the first packet of a chunk and the reception of the preceding packet (from any chunk, over any of the TCP connections), is not included in the average (i.e., "discounted").

DCR is typically going to be relatively high (i.e., higher than if the download rate were to be averaged over the entire window of time, including the bytes of the first packet chunks and including the time between the first packet and previous packet) and in some sense it can represent the true available bandwidth over the interface, depending on, as examples, network conditions, the number of TCP connections, used, and other factors. Generally, it will be the case that DCR is at least DFR, although this may not always be the case and sometimes DFR can be larger than DCR. In general, an objective of the DCR calculation is to give a value that is indicative of how to control pipelining of the data without requiring explicit feedback from the server or other external network element.

The threshold parameter, Thresh, may be determined and/or adjusted using such download rate parameters, such as in accordance with the following:

---
If DCR > DFR*1.05 then increase the value of Thresh
Else if DCR <= DFR*1.05 then decrease the value of Thresh
---

Wherein the increase/decrease value of Thresh may be a predetermined value (e.g., 2 KB), may depend on the relative ratio of DCR to DFR, etc.

Such techniques for determining the threshold parameter, Thresh, may be employed from time to time. For example, the value of Thresh may be adjusted after a predetermined period of time (e.g., every 2 seconds), upon the occurrence of an event (e.g., after a number of RTTs, such as 10, or each time a chunk request is received by the CM), etc.

Embodiments may additionally or alternatively operate to dynamically measure one or more of the download rate parameters and determine/adjust the threshold parameter accordingly. For example, after determining/adjusting Thresh, embodiments may measure the DCR and DFR based on the chunks that have been issued after the adjustment of Thresh has occurred. Thereafter, the value for Thresh may be adjusted using these updated download rate parameters. The foregoing dynamically updated measurements of DCR and DFR may, for example, be based on a fixed number T of chunk requests issued. Such a technique has the advantage that the period of measurement of DFR and DCR does depend on the RTT, which is desirable, but does not require measuring the RTT explicitly. Another advantage is that it avoids the possibility that the subsequent adjustment will be made based on measurements of DCR and DFR which happened before Thresh was adjusted the last time, and are thus no longer reflective of current network conditions.

Embodiments of the invention may utilize download rate parameters in addition to or in the alternative to the aforementioned download rate parameters (i.e., DR, DFR, and DCR). For example, in the alternative to using DFR in a Thresh determination above, CM 122 of embodiments may use DDDR (Download Discount Delay Rate), defined as the aggregate average download rate of the connections, except that in the case of DDDR the bytes of the first packet of each delayed chunk request and the time between the first packet of each delayed chunk request and the previously received packet are not counted (i.e., "discounted") when calculating DDDR, as detailed below.

In implementing an embodiment utilizing the DDDR download rate parameter, CM 122 may operate to classify a chunk request as "not delayed" if the chunk request is provided by RM 121 to the CM immediately when the CM signals it is ready for the next chunk request. Similarly, CM 122 may classify a chunk request as "delayed" if the chunk request is not provided by RM 121 to the CM immediately when the CM signals it is ready for the next chunk request (e.g., there is some delay, such as due to the RM not having a chunk request it can make when the CM signals that it is ready for the next chunk request). CM 122 may thus calculate DDDR as the download rate, except that the CM does not count the bytes of the first packet of each delayed chunk request when calculating the numerator of the DDDR, and does not count the time between the first packet of each delayed chunk request and the previously received packet, when calculating the denominator of the DDDR. The CM of embodiments may operate to consider the first chunk request it receives at the very beginning as a delayed chunk request for the sake of consistency.

From the foregoing it can be appreciated that implementations using DDDR may employ a somewhat different API between CM 122 and RM 121 than other implementations (e.g., implementations in which DFR is used). For example, when the CM signals that it is ready for a chunk request to the RM, the RM can immediately respond with a chunk request (assuming the RM has a chunk request available to make), in which case the chunk request is categorized by the CM as a not delayed chunk request in the calculation of DDDR. Alternatively, if the RM provides a chunk request to the CM that was not in response to a signal from the CM that it is ready for a chunk request, the CM would categorize the chunk request as delayed in the calculation of DDDR. A similar API can be defined between the RM and UA.

The DDDR download rate parameter of embodiments may be calculated as set forth below:

| Parameter | Meaning |
|-----------|---------|
| Z | The number of bytes downloaded so far (excluding discounted bytes) |
| Tr | The time during which download was active (excluding discounted time) |
| S | Stores a temporary time |
| Tw | The current wall clock time |

$$Z = 0$$
$$Tr = 0$$

Each time a packet P is received (of size B bytes, at wall clock time Tw):

```
If P is the first packet of a delayed chunk then {S = Tw}
Else if P is not the first packet of a delayed chunk then
    {Tr = Tr + (Tw −S);
    Z = Z + B;
    S = Tw
    }
DDDR = Z/Tr
```

In operation according to embodiments, DDDR may be calculated or averaged over a window of time that is not the entire time of the download. For example, in the case that DDDR is to be calculated over the last window of time of duration W seconds, then the numerator Z_W and the denominator Tr_W may be calculated over the last W seconds, whereby DDDR=Z_W/Tr_W. One of skill in the art will recognize that similar techniques may be used to calculate other variations of DDDR, such as using an exponential weighted moving average (EWMA) with a half-life of W.

It should be appreciated that an advantage of using DDDR instead of DFR is that calculating DDDR does not utilize any special knowledge being passed from the RM to the CM. In particular, the CM can calculate the DDDR value without the RM signaling to the CM about which chunks belong to a new fragment. Moreover, the use of DDDR allows the CM to accurately measure the time when the CM is actually downloading without any special cases. In contrast, the use of DFR presents an issue with respect to there being no difference between the DFR and the DCR when there is only one chunk per fragment. Because the use of DDDR does not have this issue, embodiments utilizing DDDR can be used without special exceptions when there is only one chunk per fragment. As a further advantage, DDDR is an appropriate measure for the live case, when the RM will not necessarily be able to supply the CM with the first chunk request of a fragment due to the fragment not being available yet, but more correctly takes care of the case when the first chunk of the next fragment can be made when the CM signals readiness for the next chunk request. In contrast, embodiments utilizing DFR discount the first packet of this new fragment, although there is no reason to discount this first packet if the CM is ready for the next chunk request. Similarly, DDDR is an appropriate measure for download cases which use a low/high watermark strategy for the same reasons above (i.e., the first packets of fragments requested immediately when downloading as the buffer fills between the low and high water mark should not be discounted, although the first packets of fragments requested after reaching the high water mark and waiting till drain to low water mark should be discounted with both DDDR and DFR).

Embodiments use the download rate parameter DDDR in all the ways described above with respect to the download rate parameter DFR. For example, CM 122 of embodiments may utilize DDDR to make decisions on how to adjust the threshold value, Thresh, where Thresh is the buffer level for a TCP connection below which a new chunk request is made. That is, if B is the amount of data requested but not yet received on a TCP connection then when B<Thresh a new chunk request can be made by the CM.

The download rate parameter DPR (Download Pipeline Rate) is another example of a download rate parameter that may be used in addition to or in the alternative to the aforementioned download rate parameters (i.e., DR, DFR, DCR, and DDDR). DPR may, for example, be used as an alternative to using DFR or DDDR in a Thresh determination above. DPR utilized according to embodiments similar to DFR, DCR, and DDDR, although there are differences as explained in the following.

DPR is defined as the aggregate average download rate of the connections (e.g., TCP connections), except that the calculation of DPR discounts the first packets of chunk requests that are made on connections that have no outstanding data when the request is made. In the calculation of DPR, some first packets of chunks are discounted if the chunk requests are delayed (e.g., no chunk request is made when the RM is notified that the CM is ready for the next chunk request). Thus, DPR is almost the same as the true download rate and, for an initial period of time, there may be no difference between DPR and DCR. For example, the first few chunk requests made on different connections at the very beginning of a session will be classified as not pipelined, as described in further detail below, (and thus the first packets of these chunks will not be counted by DPR or DCR), and similarly the first chunk request(s) for a fragment request in a live scenario may classified as not pipelined if such fragments are only available on a given timeline and the previous fragment are completely downloaded before the next fragment is available. Similarly, chunk requests made for on-demand content immediately after draining the media buffer to the low watermark when using a high-low watermark downloading method may be classified as not pipelined since all TCP connections are not in use when these chunk requests are made.

For embodiments utilizing DPR, the amount of requested but not yet received data for a connection when the next chunk request is made on that connection may be referred to as network buffered data, Buff. The threshold parameter, Thresh, represents the current pipeline threshold for that connection. Accordingly, as discussed above, a new chunk request can be put on the connection when Buff<Thresh.

Assume the CM uses pipelining on all the connections. In operation according to embodiments, the CM may classify a chunk request for a particular connection as "pipelined" (not delayed/on time) for determining DPR if the chunk request is received when Buff>=alpha*Thresh, and the CM may classify a chunk request as "not pipelined" (delayed/not on time) for determining DPR if the chunk request is received when Buff<alpha*Thresh, wherein alpha is a constant<1 (e.g., alpha=1/2 or alpha=2/3).

Where no pipelining is used the technique for lateness classification of the chunk requests for determining DPR may differ from the foregoing. In a lateness classification technique of embodiments, the number, R, of issued incomplete chunk requests which have already received a partial response at the point in time when the first part of the response for the chunk request in question is returned is computed. If R is larger than a fixed constant, fmin, the CM of embodiments may classify the request as on time, and classify it as delayed otherwise.

Additionally or alternatively, a technique for lateness classification of the chunk requests for determining DPR where no pipelining is used comprises analyzing the idle connections to the content server. For example, at the time the request is issued, logic of CM 122 may count the number of idle TCP connections to server 130. If the number of idle connections exceeds a given threshold (e.g., one-half of the available connections) the request may be classified as delayed. The request may be classified as on time otherwise.

Regardless of the particular technique utilized in classifying requests as pipelined or delayed, DPR may be calculated utilizing the pipelined/delayed classifications. In the calculation of DPR according to embodiments, the first packet of a chunk request is not discounted if the chunk request is classified as pipelined and the first packet of a chunk request is discounted if the chunk request is classified as not pipelined. "Discounted" as used in the foregoing means the bytes received in that first packet are not counted and the time between receiving that first packet and the previous received packet is not counted, whereas "not discounted" means the bytes received in that first packet are counted and the time between receiving that first packet and the previous received packet is counted.

The DPR download rate parameter of embodiments may be calculated as set forth below (it being appreciated that the example below utilizes the aforementioned network buffered data, Buff, and threshold parameter, Thresh, analysis technique in determining "pipelined" (not delayed/on time) and "not pipelined" (delayed or not on time) classifications, whereas other embodiments may utilize alternative techniques, such as those described above, for these classifications):

| Parameter | Meaning |
| --- | --- |
| Z | The number of bytes downloaded so far (excluding discounted bytes) |
| Tr | The time during which download was active (excluding discounted time) |
| S | Stores a temporary time |
| Tw | The current wall clock time |

A chunk request is made on a TCP connection with Buff octets of requested but not yet received data, where Thresh is the current pipeline threshold in octets for this TCP connection.

```
If (Buff >= alpha*Thresh) then classify this chunk request as
  "pipelined"
Else if (Buff < alpha*Thresh) then classify this chunk request as "not
  pipelined"
Chunks are received on the TCP connection in response to the chunk
requests.
  Z = 0
  Tr = 0
```

Each time a packet P is received (of size B bytes, at wall clock time Tw):

```
If P is the first packet of a chunk that is classified as "not pipelined"
then {S = Tw}
  Else
    {Tr = Tr + (Tw −S);
    Z = Z + B;
    S = Tw
    }
DPR = Z/Tr
```

In operation according to embodiments, DPR may be calculated or averaged over a window of time that is not the entire time of the download. For example, in the case that DPR is to be calculated over the last window of time of duration W seconds, then the numerator Z_W and the denominator Tr_W may be calculated over the last W seconds, whereby DPR=Z_W/Tr_W. One of skill in the art will recognize that similar techniques may be used to calculate other variations of DCR or DPR, such as using an EWMA with a half-life of W.

As examples of calculation of DCR and DPR using an EWMA according to embodiments herein, assume a packet is received that is not to be discounted (is not the first packet of a chunk), the packet contains B bits of data, and the time between the arrival of the packet and the previous packet (of any type) is dt. DCR may be updated as follows:

```
DCR = DCR * exp(−alpha*dt)
DCR = TDCR + B/alpha
```

The value of alpha in the foregoing can be chosen, for example, so that the averaging decays over a period of time that is proportional to 1/alpha. The time units of alpha are aligned with the time units of dt of embodiments. For example, if dt is expressed in milliseconds in the foregoing, and the target is a decay of 1/e over a second, then in accordance with an embodiment alpha=1/1000. As another example, if dt is expressed in seconds and the target is a decay of 1/e over a second then alpha=1 in accordance with an embodiment. Carrying the foregoing example embodiments further, for a target decay of 1/e over possibly multiple seconds, e.g., over 5 seconds, if dt is expressed in milliseconds then alpha=1/5000, and if dt is expressed in seconds then alpha=1/5 in accordance with embodiments herein.

The above concepts for calculating DCR using EWMA can be applied to the calculation of DPR using EWMA (discounting first packets of chunks that are not pipelined enough). For example, embodiments for calculating DPR using EWMA may use the same value alpha for both DCR and DPR. Alternative embodiments, however, may use different averaging constants for DCR and DPR (e.g., alphaC for DCR and alphaP for DPR).

Having described techniques for calculating the download rate parameters DCR and DPR, examples of their use in adjusting the threshold value, Thresh, (i.e., the buffer level for a connection below which a new chunk request is made) will be provided below. It should be appreciated that there are many techniques by which the value of Thresh can be obtained using DCR and DPR in accordance with the concepts herein.

As one exemplary example of the use of DCR and DPR for adjusting the value of the threshold parameter, Thresh, let R be the average response time between when HTTP chunk requests are made by the CM and when the first response to the request is received by the CM. For each chunk request, let RTT be the response time between the time when the request is made and when first response is received. Using the foregoing, $R=(1-a1)*R+a1*RTT$. It can be appreciated that there are many ways to compute R, such as averaging measured RTTs using an EWMA over a window of time or over the number of RTT measurements, by averaging over a fixed previous window of time or over a fixed previous number of RTT measurements, etc.

In utilizing DCR and DPR to adjust Thresh according to embodiments, let Thresh be the total amount of bytes across all the connections that are allocated to the threshold. The value of Thresh can be updated periodically, for example each $a2*R$ seconds, as follows:

---
If (DCR*a3 > DPR) then Thresh = min{Thmax, Thresh(1+a4)}
Else if (DCR*a5 > DPR >= DCR*a3) then Thresh = min{Thmax, Thresh*(1+a6)}
Elseif (DCR*a5 <= DPR) then Thresh = max{Thmin, Thresh*(1 − a7)}
---

Wherein example values for the constants, a1, a2, a3, a4, a5, a6, and a7, and the threshold minimum and maximums, Thmin and Thmax, are as follows:

---
a1 = 0.05
a2 = 2
a3 = 0.7
a4 = 0.5
a5 = 0.95
a6 = 0.1
a7 = 0.05
Thmin = 32 KB
Thmax = 1 MB
---

From the foregoing, it can be appreciated that DCR is going to be at least DPR. Where DPR is significantly less than DCR it is an indication that there is a large gap between the first packet of chunks and the previous packet (e.g., the chunk requests are not being made soon enough). Where DCR and DPR are the same or nearly the same value, embodiments may operate to maintain the threshold parameter, Thresh, at its current value or perhaps slowly raise the value.

In adjusting the threshold parameter, Thresh, according to embodiments herein a goal is to obtain an interpacket spacing between the first packet of chunks and the packets of a previous chunk to be approximately the same as the spacing between any other packets within a chunk (i.e., interpacket spacing≈intrapacket spacing). When such a condition is achieved, enough data has been pipelined and requests have been made far enough in advance that the bandwidth efficiency is optimized. Thus, although it may be desirable to implement a small threshold parameter so as to ensure that the different connections are downloading data at approximately the same rate and so that the amount of data buffered in the network is as small as possible, embodiments operate to implement a threshold which is large enough to avoid significant gaps in the interpacket spacing.

It should be appreciated that various alternatives may be utilized with respect to the foregoing according to the concepts herein. For example, at some values of DCR and DPR the value of Thresh may not change when the decision is made to adjust the value of Thresh (e.g., when DPR is smaller than but substantially equal to the value of DCR, such as when the value of DPR/DCR is within the interval (0.9, 0.95)). Accordingly, an alternative embodiment may operate to adjust the value of Thresh by setting Thresh=Thresh*(DCR/DPR). Although this technique is similar to the approach discussed above, it is more flexible in terms of the amount of adjustment that can be applied, and thus may reduce the number of configuration parameters. As another example of an alternative embodiment, the value of Thresh may be adjusted by setting Thresh=Thresh+delta* (1−DPR/DCR), where delta=32 KB. This alternative technique is based on additive increase, and may converge more slowly. It should be appreciated that embodiments implementing either of the foregoing alternative techniques for adjusting the threshold parameter, Thresh, may continue to apply the threshold minimum and maximum constraints, Thmin and Thmax.

It can be appreciated that various download rate parameters (e.g., DPR, DCR, and DFR) can be used for determining how much requested but not yet received data to allow and for management of the amount of requested but not yet received data on each connection. Moreover, download rate parameters as provided herein (e.g., DPR and DFR) may be utilized for providing download statistics to a UA, such as for determining when and/or what fragments to request.

Various advantages of using DPR and DCR to calculate the threshold parameter value, Thresh, can be appreciated from the foregoing. For example, the value of DPR distinguishes whether or not the pipelining value Thresh provides enough pipelining to achieve the download rate DCR, as a difference between DPR and DCR is that DPR includes as part of the download rate the first packets of chunks that are pipelined whereas DCR does not. Thus, if Thresh is sufficiently large, there should be only a small difference between the value of DCR and DPR, whereas if Thresh is not sufficiently large then there should be a larger difference between the value of DPR and the value of DCR, where generally the value of DCR is larger than the value of DPR. As a further advantage, the CM can calculate DPR without any signaling or input from the RM.

As previously mentioned, the foregoing download rate parameters and threshold parameter may be utilized in determining when chunk requests are to be made with respect to the connections of a multiple connection CM configuration (e.g., CM-mHTTP), whereby the CM is adapted to use multiple connections for requesting and receiving content from one or more content server according to the concepts herein. For example, where B is the number of requested but not received bytes on all the connections, a determination regarding whether a new chunk request can be issued may be made based upon a comparison of B to Thresh (e.g., if B<Thresh a new chunk request can be issued).

Where a new request is to be issued in a multiple connection (e.g., CM-mHTTP) configuration, a suitable connection of the plurality of connections for the new request may be selected. For example, the connection with the least number of outstanding bytes (e.g., requested but not yet received bytes) may be selected for the new request according to embodiments. Alternative embodiments may, however, make the decision regarding new requests individually for each connection. Embodiments may, for example, select a connection for a chunk request to provide load balancing, whereby the chunk requests for any particular connection may be weighted based upon one or more download rate parameters thereof. Where a chunk request that has not been completely served by the content server on one connection is resent, the chunk request may be resent over one or more different connections, whether entirely or partially, to reduce the likelihood that the chunk request's completion time becomes too late.

A decision as to whether to make a new chunk request may, for example, be made for each of N active connections in accordance with the following:

If (B<Thresh/N) then this connection can accept another chunk request Where B is the number of requested but not received bytes on the connection.

The number of connections, N, (e.g., TCP connections) to be used can be dynamically adjusted by a CM providing a multiple connection configuration (e.g., CM-mHTTP). For example, a minimum and maximum number of connections (e.g., minimum connections=2 and maximum connections=8) for a CM instance may be preselected, whereby the particular number of connections used at any particular time may be dynamically adjusted based upon one or more operational metrics. The addition of connections may, for example, be used to provide additional throughput, such as where the packet error rate is related to the RTT and thus additional connections may be supported.

In general, embodiments operate to have requested but not yet received data with respect to any particular connection in an amount less than the congestion window for that particular connection. Where the congestion window is small, a larger number of connections would thus be suggested than where the congestion widow is large. Unfortunately, client devices, such as client device 110, do not typically have access to congestion window information. Accordingly, embodiments herein may operate to utilize download parameters and/or threshold parameters, as described above, in dynamically adjusting the number of connections used by a CM.

In dynamically adjusting the number of connections according to embodiments, let X_i=min{CWND_i, RWIN_i, SWIN_i}, where CWND_i is the current congestion window size of the sender, RWIN_i is the receiver window size, and SWIN_i is the sender window size, respectively, for connection i. Additionally, let RTT be the average RTT, for example measured as the average time between when a chunk request is made and when the first response to that chunk request is received over the connection. DPR is generally at most the sum over i of X_i/RTT, and similarly DPR is generally at most BuffAvg/RTT, where BuffAvg is the average amount of data that is requested but not yet received in within all the connections. The CM of embodiments has measurements of RTT and DPR, and is operable to control the threshold parameter, Thresh, and the chunk request size (as discussed above), and thus controls BuffAvg. Although such a CM may not directly know the value for each i of X_i, the CM may nevertheless adjust the number, N, of connections according to the following:

If DPR is smaller than BuffAvg/RTT then the number, N, of connections can be increased.

If DPR is approximately equal to BufAvg/RTT then the number, N, of connections can be decreased.

Figure 5:
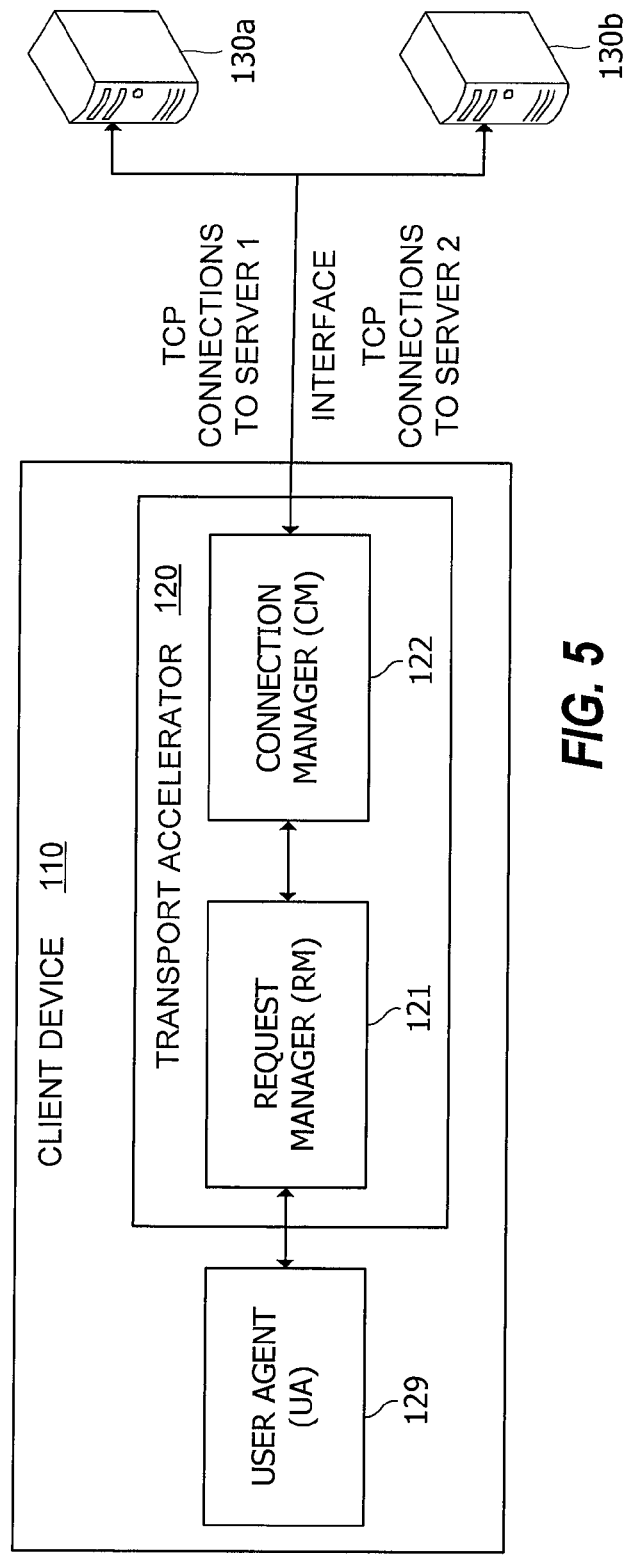
FIG. 5 shows utilizing multiple connections used with respect to a plurality of content servers for the transfer of content for a client device according to embodiments of the present disclosure.

Embodiments have been described above with respect to a CM configuration utilizing multiple connections for the transfer of content for a client device. Such connections may be made with respect to one or more content servers (e.g., content server 130 as shown in FIG. 1A or content servers 130a and 130b as shown in FIG. 5). Accordingly, it should be appreciated that concepts herein may be applied with respect to one or more content servers providing transfer of content using a transport accelerator of embodiments.

In operation according to embodiments, the CM is responsible for establishing and managing all connections to the one or more content servers across one or more interfaces (e.g., an LTE interface, a Wifi interface, etc.), and indicating to the RM when the CM is ready for another chunk request that will be made on one of the connections. Let Thresh be a threshold value in octets (bytes) for the interface managed by the CM, wherein the value of Thresh is adjusted up or down based on DCR and DPR, as described above, except that the definition of DPR is modified as below. Let B be the total number of octets (bytes) that have been requested but not yet received by the CM across all connections of an interface managed by the CM. When a chunk request is made by the CM if B<alpha*Thresh then the chunk request is considered to be delayed in the DPR calculation, whereas if B>=alpha*Thresh then the chunk request is considered to be not delayed in the DPR calculation. Let ND be a target total number of connections that the CM can use in addition to one connection to each active content server. The value of ND may be determined dynamically by the CM, or it may be set to a constant value (e.g., ND=8). Let NO be the number of content servers (origin servers) for which the CM is currently working on chunk requests. Then, the total target number of connections that the CM maintains is approximately N=ND+NO, which is based on the following:

---

Let B_I be the total number of octets (bytes) that have been requested but not yet received by the CM across all connections to origin server I of the interface managed by the CM.

Let N_I = ND*(floor(sum_J<=I {B_J }/sum_I {B_I}) − floor(sum_J<I {B_J }/sum_I {B_I})) + 1 be the target number of connections to origin server I over the interface managed by the CM, and thus sum_I {N_I} = ND + NO.

When B < Thresh then CM signals to RM that it is ready for a chunk request.
When the CM receives a chunk request from the RM then
    Determine to which origin server I the chunk request is for
    Determine N_I as described above
    Determine A_I = number of active* connections to I
        If A_I >= N_I then make an HTTP request for the chunk on the active connection to I with the least amount of requested but not yet received data
        If A_I < N_I then start a new connection to I and make an HTTP request for the chunk on that connection

---

Classify the chunk request as delayed if B<alpha*Thresh when the HTTP request for the chunk is made (don't count first packet of chunk and time between first packet of chunk and previous packet when calculating DPR).

In operation according to the foregoing exemplary embodiment, a connection is considered active if the connection has requested but not yet delivered data, the connection has no requested data but has not yet timed out as measured by the client, or the connection has timed out signaled by the server.

As previously discussed, FIG. 1B provides a high level architecture for RM 121 and CM 122 components of TA 120. Further details with respect to an exemplary embodiment of TA 120 are provided below with reference to the Transport Accelerator configuration of FIG. 1C to provide context for the components that implement such an embodiment of TA 120.

RM 121 of this exemplary embodiment is preferably configured to provide the following functionality within TA 120. RM 121 accepts requests from UA 129 for data download, that are to be accelerated, from TA request dispatcher 1024. In operation according to embodiments, RM 121 may signal readiness to accept another data request to be accelerated to TA request dispatcher 1024. RM 121 splits the data requests into chunk requests. In operation according to embodiments, the preferred size for each chunk request, $C_{Target(I)}$ for an origin server I, is indicated by CM 122. RM 121 of embodiments spreads chunk request sizes evenly around the preferred size. RM 121 issues the chunk requests to the CM 122. In operation according to embodiments, chunk requests are issued when CM 122 indicates it is ready for a new request. RM 121 may schedule chunk requests within the constraints of a scheduling algorithm to ensure fairness across request queues from different UAs 129 and while ensuring proper request prioritization. RM 121 assembles responses for chunk requests into responses for requests from UAs 129. RM 121 may then transfer these responses back to UA 129 such that data is delivered to the upper layers in an in-order and contiguous fashion.

CM 122 of this exemplary embodiment is preferably configured to provide the following functionality within TA 120. CM 122 manages the number of HTTP chunk requests to each origin server. CM 122 of embodiments issues chunk requests for multiple origin servers. In operation according to embodiments, the number of chunk requests varies between defined configuration parameters. For example, CM 122 of embodiments computes DCR and DPR, wherein DCR and DPR are used to compute an aggregate value T which is used to compute preferred chunk size $C_{Target(I)}$ for the request chunking by the RM 121. A goal of such operation according to embodiments is to make the chunks large enough to get a good rate, but to keep the overall amount of requested data as small as possible. CM 122 of embodiments decides readiness to issue new chunk requests to stack processing 1025. In operation according to embodiments, CM 122 communicates chunk request readiness to RM 121. A goal of such operation according to embodiments is to keep connections busy in stack processing 1025 but not queue up chunk requests too far ahead. CM 122 may make requests (e.g., HTTP requests) for chunks to stack processing 1025 and provide the data responses to RM 121.

Having described the general functionality of TA 120 and RM 121 and CM 122 thereof of this exemplary embodiment, algorithms as may be implemented within the RM and CM components of TA 120 in accordance with the exemplary embodiment are provided below.

Figure 7:
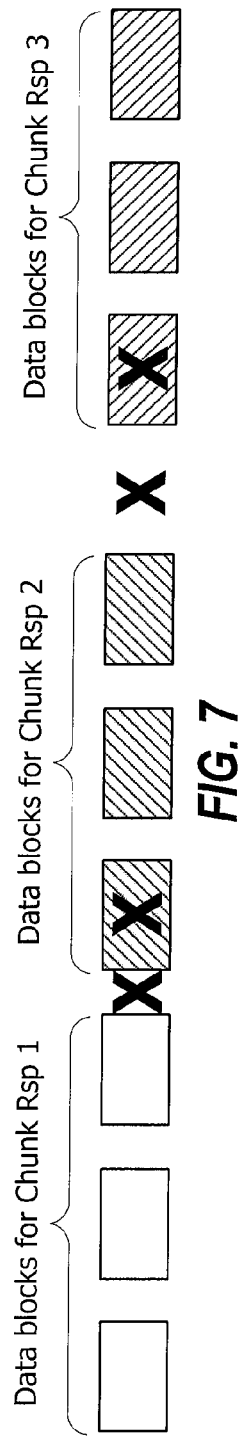
FIG. 7 shows Download Chunk Rate discounting according to embodiments of the present disclosure.

In operation according to embodiments, CM 122 keeps a measure of DCR and/or the average DCR. CM 122 may do so, for example, by measuring the download rate but discounting the gaps between chunk responses. To discount the gap between chunks, CM 122 of embodiments discounts the bytes in the first data received for each chunk and also discounts the time between the arrival of first data of a chunk and the last data received for a preceding received chunk. An example of DCR discounting is shown in FIG. 7, wherein discounted time and data is designated by Xs. Typically, as shown in FIG. 7, the blocks of response data received for HTTP requests are payloads of TCP network packets. However, due to transmission errors and other imperfections, every single TCP segment may not be received in isolation, but rather in larger blocks (e.g., particularly when downloading over fast links with small RTTs), Thus, the individual data blocks received at one time may not provide good approximations of the TCP packets because the individual data blocks received at one time are much larger blocks comprising multiple TCP packet of data received at one time by CM 122. The DCR calculations by CM 122 described below take into account the possibility of reception of large blocks of data at one time, and similarly the DPR calculations by CM 122 described below take into account the possibility of reception of large blocks of data at one time.

The DCR is an estimate of the download rate that could be achieved in the given conditions if the chunk requests were arbitrarily large. Note that if chunk requests are small, the idle time between sending out each chunk request and the start of reception the response will affect the overall download rate negatively. Increasing the chunk size will thus increase the effective download rate to some extent. The DCR estimate is corrected for this effect, and is thus substantially independent of the chosen chunk size.

To compute the DCR, running variables TDCR and ZDCR, corresponding to the cumulative amount of time spent on receiving data and the amount of data received when the first received block of each chunk is discarded, are computed according to embodiments. A helper data structure unseen_chunk_ids, that contains chunk IDs and tracks the chunk IDs for which a request has been sent out, but no data has been received yet, is also utilized according to embodiments.

The initialization of the foregoing variables and data structure according to embodiments may be as shown below, wherein MSS is a constant that is preferably set to approximate the maximum size of a TCP packet (e.g., MSS=1500 bytes) and Cmult is a constant that is less than 1 (e.g., Cmult=2/3):

```
Set T_DCR = 0
Set Z_DCR = 0
Set unseen_chunk_ids = empty_set( )
Set T_last_data_recv = now (in ms)
```

In operation according to embodiments, when a new chunk request C comes from the RM, its ID is added to the set of unseen chunk IDs as shown below:
unseen_chunk_ids.add (chunk_id$_C$)
The chunk request C is then issued to stack processing 1025 according to embodiments.

When data for a chunk request C arrives, the following steps are executed to update TDCR, ZDCR, and unseen_chunk_ids according to embodiments:

```
Let current_time be the current time (in ms)
Let deltaT = current_time − T_last_data_recv (time since any data, for any
   chunk, was last received)
T_last_data_recv = current_time
Let deltaZ = amount of data received (including HTTP header
   overheads)
if chunk_id_C in unseen_chunk_ids:
   If deltaZ > MSS then
       T_DCR = T_DCR + deltaT * Cmult * (deltaZ − MSS) / deltaZ
       Z_DCR = Z_DCR + deltaZ − MSS
   Remove chunk_id_C from unseen_chunk_ids
else:
   T_DCR = T_DCR + deltaT
   Z_DCR = Z_DCR + deltaZ
```

It can be appreciated from the foregoing, if deltaZ<=MSS is the amount of data received for a chunk for which no previous data has been received then all of deltaT and deltaZ are discounted (i.e., nothing is added to TDCR and ZDCR). However, if deltaZ>MSS is the amount of data received for a chunk for which no previous data has been received then, instead of discounting all of deltaT and deltaZ, operation according to the foregoing discounts deltaT by a factor Cmult*(deltaZ−MSS)/deltaZ and adds the discounted value to $T_{DCR}$, and further discounts deltaZ by a factor (deltaZ−MSS)/deltaZ and adds the discounted value to $Z_{DCR}$. Thus, essentially only the first MSS of the received data is discounted and the remainder is counted in the DCR parameters $Z_{DCR}$ and $T_{DCR}$. The additional discount of deltaT by Cmult ensures that the ratio of the discounted deltaZ value divided by the discounted deltaT value is greater than the ratio of deltaZ, divided by deltaT, which in turn ensures that the overall effect on DCR will generally be more positive than the effect on DPR due to the reception of data received for a chunk for which no previous data has been received when deltaZ>MSS since Cmult<1.

TDCR and ZDCR are monotonically increasing numbers. CM 122 of embodiments further operates to keep track of some history of DCR, and therefore the CM may keep an array of (TDCR, ZDCR)-pairs, such as may be stored in their historical order. This array is referred to herein as mapTDCRZDCR. The updates in mapTDCRZDCR happen according to embodiments whenever new data is received. In practice, it may be desirable to remove old entries from mapTDCRZDCR to avoid unbounded growth of the history, and thus mapTDCRZDCR may be stored in a circular queue according to embodiments herein.

For the remainder of the discussion of the exemplary embodiment, DCR(dcr_dpr_estimate_win) denotes the DCR estimated over a previous window of duration dcr_dpr_estimate_win, where dcr_dpr_estimate_win is a configuration parameter.

The achieved download rate of an HTTP client depends on how aggressively the client requests data. For example, if a large file is being downloaded, a high download rate can be achieved, since it is clear ahead of time what needs to be requested and thus TA 120 may be operated such that it will never be starved for chunk requests to issue. On the other hand, if the client is a DASH client playing live content, for example, it may only be capable of requesting small snippets of data in advance (since the video is not available far into the future), and thus may not be capable of achieving a very high download rate.

The Download Pipeline Rate (DPR) utilized according to embodiments is an estimate of the achievable saturated download rate in the current state (e.g., chunk size, concurrency). In other words, the DPR estimates the rate that would be achieved with a large file download with the current TA 120 settings.

In order to compute the DPR according to embodiments herein, chunk requests are grouped into epochs. A new epoch may, for example, be started whenever a chunk request is delayed (e.g., when a significant amount of time passed since TA 120 became ready to send a chunk request, and the next chunk request was issued). The DPR may be computed by measuring the download rate but discounting the gaps between first data downloaded for chunks or sub-requests from new epochs.

Figure 8:
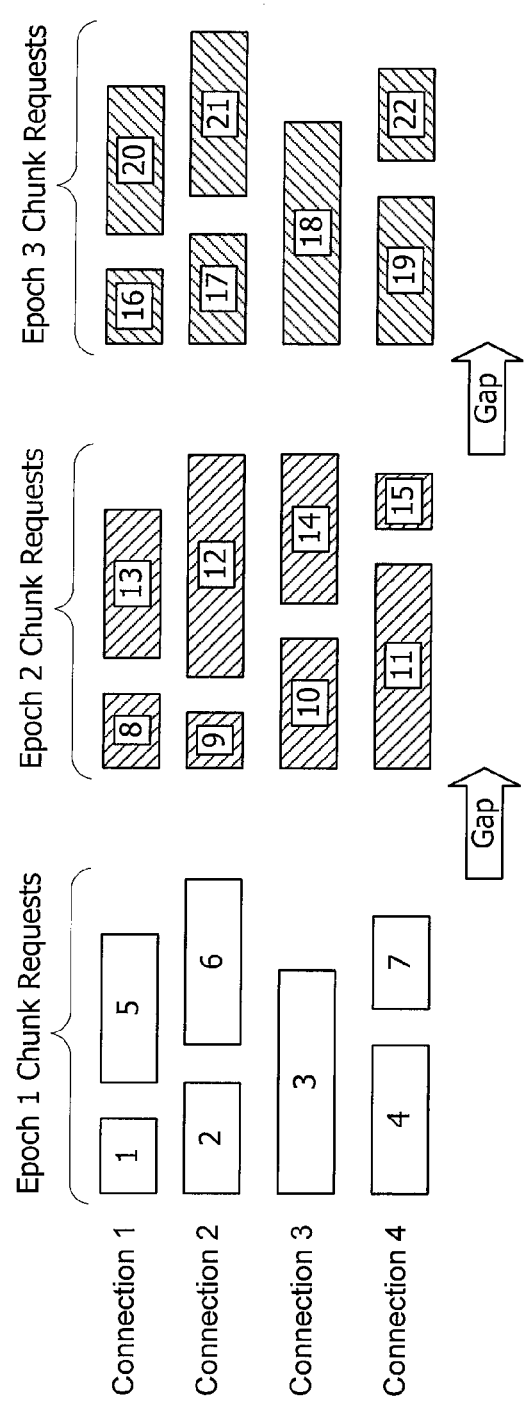
FIG. 8 shows classification of chunk requests into epochs according to embodiments of the present disclosure.
Figure 9:
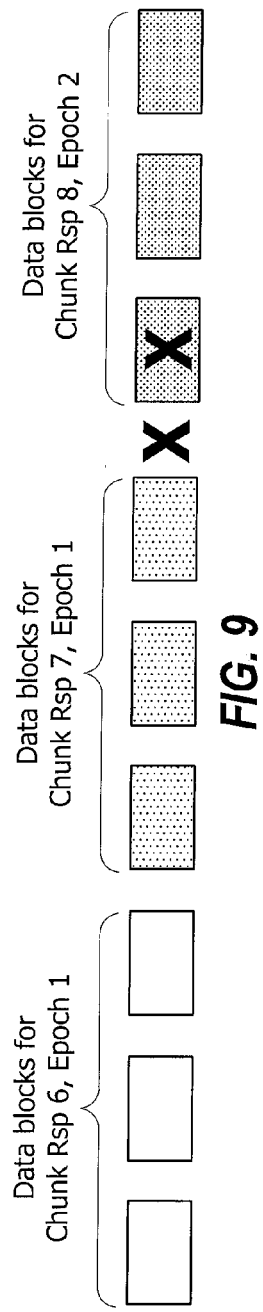
FIG. 9 shows Download Pipeline Rate discounting according to embodiments of the present disclosure.

Chunk requests received at CM 122 from RM 121 are classified into epochs. In operation according to embodiments, a new epoch is started for each "delayed" chunk request. An illustration of the classification of chunk requests into epochs is illustrated in FIG. 8, wherein a chunk request is typically designated as late or delayed under one or more of the following conditions: The first issued chunk request of a download session; When requests from UA 129 to RM 121 are late; In on-demand streaming with high/low watermark draining of buffer; and In live streaming when fragments are available on a fixed timeline. When the first data for an epoch arrives, it is counted as "delayed" and discounted from the DPR calculations. An example of DPR discounting is shown in FIG. 9, wherein the time and data designated by Xs are discounted. Typically, as shown in FIG. 9, the blocks of response data received for HTTP requests are payloads of TCP network packets. However, similar to the DCR techniques described above, the DPR techniques described below take into account the possibility that more than one TCP network packet may be received at one time.

The DPR may be computed according to the algorithms described below. It should be appreciated that the approach taken with respect to computation of the DPR is similar to the computation of the DCR described above. As before, let MSS be a constant that is preferably set to approximate the maximum size of a TCP packet (e.g. MSS=1500 bytes). Similar to Cmult used above, let Pmult be a constant that is less than 1 (e.g., Pmult=2/3). The values of Cmult and Pmult may, according to embodiments, be set to the same value or to different values. The DPR computation algorithm utilized according to embodiments depends on a configuration parameter epoch_time_threshold, which is the minimum amount of time (in milliseconds) between request readiness and request issue that triggers a new epoch (e.g., epoch_time_threshold=20 is a reasonable setting for this parameter). The DPR algorithm of embodiments may keep track of TDPR and ZDPR variables, wherein the timer TDPR counts the cumulative amount of time that the TA spent on downloading data, discounting for the gaps between epochs, and the counter ZDPR counts the cumulative number of bytes received, discounting the first bursts received at epoch beginnings. The algorithm may keep track of a number of other variables as well, such as current_epoch_id (i.e., the current epoch number that is assigned to new chunk requests), awaited_epoch_id (i.e., the next epoch ID for which the first received data payload has not been discounted yet), ready_flag (i.e., a flag that indicates whether the CM is ready to accept new requests), and last_ready_time (i.e., indicating the point in time, when the CM became ready to accept new chunk request, if ready_flag is set (if the ready_flag is not set, the value is not used)).

At startup of a DPR computation algorithm according to embodiments, the foregoing variables may be set as follows:

Set $T_{DPR}$ = 0
Set $Z_{DPR}$ = 0
Set current_epoch_id = 0
Set awaited_epoch_id = 0
Set ready_flag = True
Set last_ready_time = now (in ms) − epoch_time_threshold − 1
Set $T_{last\_data\_recv}$ = now (in ms)

When a chunk request C comes from RM 121 the DPR computation algorithm of embodiments operates as follows:

Set delta = now (in ms) − last_ready_time
if ready_flag == True and delta > epoch_time_threshold,
    Set current_epoch_id = current_epoch_id + 1
C.epoch_id = current_epoch_id
ready_flag = False
Invoke internal readiness update algorithm The chunk request C may then be issued to stack processing 1025.

When data for a chunk request D arrives the DPR computation algorithm of embodiments operates as follows:

```
Let current_time = now (in ms)
Let deltaT = current_time - T_last_data_recv (time since any data, for any
chunk, was last received)
T_last_data_recv = current_time
Let deltaZ = the amount of data received, including HTTP header
overhead
if D.epoch_id ≥ awaited_epoch_id,
    // Data starts new epoch, discount.
    If deltaZ > MSS then
        T_DPR = T_DPR + deltaT * Pmult * (deltaZ - MSS) / deltaZ
        Z_DPR = Z_DPR + deltaZ - MSS
    Set awaited_epoch_id = D.epoch_id + 1
else:
    T_DPR = T_DPR + deltaT
    Z_DPR = Z_DPR + deltaZ
```

In operation according to embodiments, deltaZ does include the HTTP header overhead, and likewise for the corresponding snippet in the DCR computation. Not including the header overhead may often be important because the header may be sufficiently large to affect the algorithms (e.g., if the chunk size is small).

In the foregoing description, the variable Tlast_data_recv as used for DCR is distinct to the one used for DPR. Since both algorithms are invoked at the same points in time, a common variable could also be used, provided it is not updated twice per DPR and DCR invocation.

TDPR and ZDPR are monotonically increasing numbers. The CM may keep track of some history of those values, and therefore CM 122 of embodiments stores these variables in a circular queue referred to herein as mapTDPRZDPR. The size of that circular queue can be chosen in much the same way as the one for DCR.

For the remainder of the discussion of the exemplary embodiment, DPR(dcr_dpr_estimate_win) denotes the DPR estimated over a previous window of duration dcr_dpr_estimate_win, wherein dcr_dpr_estimate_win will generally be the same duration of time as that for DCR.

Figure 10A:
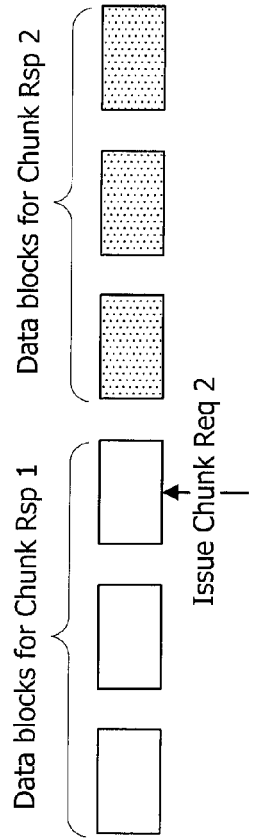
Figure 10B:
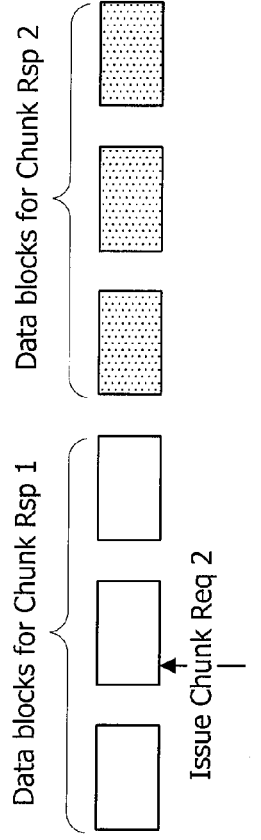

CM 122 of embodiments keeps a measure for the T value which is an approximation for the aggregate size of active chunk requests. In operation according to embodiments, the requests are chunked and CM 122 indicates readiness to issue new chunk requests based on its current measure for T value. A goal for the T value adjustment algorithm according to embodiments is that T should be large enough to ensure close to the largest download rate possible while, subject to the foregoing, T should be as small as possible. If T value is too small, CM 122 sees more than average "gap" between when current HTTP chunk request completes and when first response from next HTTP chunk request starts. This is illustrated in FIG. 10A. If T value is just right, first response to next HTTP chunk request comes at same pacing as all other packets of chunk after current HTTP chunk request completes. This is illustrated in FIG. 10B. If T value is too large, a lot of HTTP chunk requests are committed sooner than is necessary. This is illustrated in FIG. 10C.

CM 122 of embodiments uses the current values of DPR and DCR, averaged over the previous window of duration dcr_dpr_estimate_win, to adjust the T value measure periodically. The following relationships between DCR and DPR generally hold: DCR is generally at least as large as DPR; DCR is generally more than DPR when there is a larger than average gap between first data block of a chunk and the previous received data block (this implies more data should be requested on the link and hence, T should be increased); and DCR is generally approximately equal to the DPR when there is an average gap between first data block of a chunk and the previous received data block (this implies requests were early and big enough and hence, T is large enough and may be decreased). The concepts of average gap when DCR=DPR and larger than average gap when DCR>DPR are illustrated in FIG. 11.

In operation according to embodiments, the T value adjustment algorithm uses the foregoing observations to adjust the T value periodically and maintain an optimal T for the given link conditions. The configuration parameters and T value adjustment algorithm used by CM 122 of embodiments are set forth below:

| Configuration Parameter | Value | Significance |
| --- | --- | --- |
| cm_target_delta | 0.95 | Target is to set T such that DPR = cm_target_delta * DCR |
| cm_step_alpha | 0.25 | Step attenuation; to reduce convergence speed by a factor of 1/cm_step_alpha in exchange for better stability. This parameter has been tuned for the current default value of $t_{MinTAdjInterval}$ and may change if the latter is changed. |
| cm_cp_ratio_max | 2 | Maximum allowable ratio of DCR/DPR in calculations |
| cm_cp_ratio_min | 1 | Minimum ratio of DCR/DPR in calculations |
| $t_{MinTAdjInterval}$ | 500 | Minimum time interval (in ms) between consecutive T value updates |
| $C_{Init}$ | 16384 | Initial target chunk size (used when T history is not available) in bytes |
| $C_{min}$ | 16384 | Minimum target chunk size in bytes |
| $T_{max}$ | 3145728 | Maximum T value in bytes. (Set to a multiple, e.g. 2 multiple, of the maximum bandwidth*RTT that the TA 120 is configured to support - set here to support approximately a max bandwidth of 12 Mbps and a max RTT of 1 sec) |
| $smin_{Total}$ | 4 | Minimum target request concurrency across all origin servers |

-continued

| Configuration Parameter | Value | Significance |
|---|---|---|
| TA$_{history\_filename}$ | String | Filename of file to retrieve T$_{Init}$ from a startup, and store T value to, at finish |
| dcr_dpr_estimate_win | 2000 | Window over which to estimate DCR and DPR measurements, in milliseconds |

At startup of the T value adjustment algorithm of embodiments the variables may be initialized as follows:

```
Set T_Init = C_Init * smin_Total (or load it from history file, if available)
last_tvalue_update_time = now (in ms)
Set T_min = C_min * smin_Total
Set w = dcr_dpr_estimate_win
```

In operation according to embodiments, whenever data is received or timeout of 100 ms occurs for an active CM (i.e., the CM has some outstanding requested data):

```
If DCR(w) is invalid or DPR(w) is invalid
    return
current_time = now (in ms)
If current_time - last_tvalue_update_time > t_MinTAdjInterval,
    If DCR(w) > DPR(w) * cm_cp_ratio_max,
        ratio = cm_cp_ratio_max
    Else if DCR(w) < DPR(w) * cm_cp_ratio_min,
        ratio = cm_cp_ratio_min
    Else:
        ratio = DCR(w)/DPR(w)
    z = 1 + cm_step_alpha * (cm_target_delta * ratio - 1)
    Set T = min(T_max, max(T*z, T_min))
    last_tvalue_update_time = current_time
```

The calculations in the above functions are performed according to embodiments in floating point arithmetic. At termination, CM 122 of embodiments operates to write the final value of T to history file if the TAhistory_filename has been set through a configuration.

In operation according to embodiments, RM 121 queries CM 122 for readiness to issue a new chunk request for an origin server I. CM 122 may in turn determine whether it is ready to issue a new chunk request to origin server I by using a readiness algorithm. Internally, CM 122 of embodiments keeps track of the chunk requests already issued for different origin servers to the network stack. The CM may use this information, along with configuration information about the maximum number of connections allowed per origin server by the network stack, to regulate and schedule chunk requests to the stack. The CM may also use its measure of T value to ensure that the link is used to its maximum capacity without over committing to requests sooner than necessary.

The configuration parameters and readiness algorithm used by CM 122 of embodiments are set forth below:

| Configuration Parameter | Value | Significance |
|---|---|---|
| C$_{min}$ | 16384 | Minimum target chunk size in bytes |
| smin$_{Total}$ | 4 | Minimum target request concurrency across all origin servers |
| smax$_{Total}$ | 256 | Maximum request concurrency across all origin servers allowed by the network stack |

-continued

| Configuration Parameter | Value | Significance |
|---|---|---|
| smax$_{Org}$ | 12 | Maximum request concurrency for a single origin server (Set to the maximum socket pool per origin for accelerated requests configured within Chromium) |
| ready_threshold | 250 | Readiness threshold constant |
| epoch_time_threshold | 20 | Minimum amount of time (in ms) between request readiness and request issue that triggers a new epoch |

CM 122 of embodiments may perform the following when the CM is queried for readiness for a particular origin server by RM 121:

```
Q_I = current number of active chunk requests to origin server I
Q = current number of active chunk requests to all origin servers =
    sum_I(Q_I)
R_Avg = average current number of receiving chunk requests from all
    origin servers (Use R_Avg calculation algorithm).
// Find Qallow which is
// max{Z: T >= Cmin*(Z+1)
//    and (ready_threshold*Z <= 1000*R_Avg or Z < smin_Total)
//    and Z - Q + QI < smax_Org
//    and Z < smax_Total}
bound1 = floor(T/C_min) - 1
bound2 = max(floor(1000*R_Avg/ready_threshold), smin_Total - 1)
bound3 = smax_Org + Q - Q_I - 1
bound4 = smax_Total - 1
Qallow_I = min{bound1, bound2, bound3, bound4}
CM is ready for a chunk request to any origin server I where Qallow_I >=
    Q
```

To understand the readiness algorithm implemented according to embodiments, let deltaI be the additional chunk requests that can be possibly issued for a particular origin server I. Then QallowI (which is calculated for readiness) is the total number of active chunk requests in the system if we were to succeed in issuing deltaI chunk requests (i.e., QallowI=deltaI+Q).

In operation according to embodiments, CM 122 keeps a measure of the average number of active chunk requests receiving data (R) for use in the readiness algorithm. The configuration parameters and algorithm for calculating RAvg by CM 122 of embodiments are set forth below:

| Configuration Parameter | Value | Significance |
|---|---|---|
| receive_req_avg_const | 0.25 | Averaging constant used in the receive request averaging algorithm |
| t$_{MinRAvgAdjInterval}$ | 500 | Minimum time interval (in ms) between consecutive R$_{Avg}$ value updates |
| TA$_{history\_filename}$ | String | Filename of file to retrieve R$_{Avg}$ from a startup, store R$_{Avg}$ to at finish |

At startup of the algorithm for calculating RAvg the variables may be initialized as follows according to embodiments:

```
Set R_Avg = 0 (or load it from history file, if available)
last_Ravg_value_update_time = now (in ms)
```

In operation according to embodiments, whenever data is received or timeout of 100 milliseconds occurs for an active CM 122 (i.e., CM 122 has some outstanding requested data):

```
current_time = now (in ms)
R = current number of active chunk requests receiving data across all
origin servers
If current_time - last_Ravg_value_update_time > t_MinRAvgAdjInterval,
    If R > R_Avg,
        R_Avg = R
    Else:
        R_Avg = ((1 - receive_req_avg_const) * RAvg) +
                (receive_req_avg_const * R)
    last_Ravg_value_update_time = current_time
```

At termination, CM 122 of embodiments may write RAvg to a history file, if the TAhistory_filename has been set through a configuration.

A purpose of the internal readiness algorithm implemented according to embodiments is to update the ready_flag and last_ready_time within CM 122. These may be used by CM 122 to classify incoming requests into the aforementioned epochs for DPR calculations.

In operation according to embodiments, the internal readiness algorithm is executed by CM 122 immediately after a chunk request is received from RM 121 and after data is received from the stack for any of the already issued chunk requests. The following provides an internal readiness update algorithm utilized according to embodiments herein:

```
if ready_flag == True,
    return // Skip if readiness is already established
Let A be the list of active origin servers (servers with at least one active
chunk request)
for i in A:
    determine readiness for origin server i
    if CM ready for origin server i,
        ready_flag = True
        last_ready_time = now (in ms)
```

After querying for request readiness for a particular origin and before chunking the request, RM 121 of embodiments queries CM 122 for a preferred chunk size for a chunk request for a particular origin server. In operation according to embodiments, CM 122 uses a preferred chunk size calculation algorithm to communicate a preferred chunk size for an origin server request to RM 121. The following parameter may be utilized in computing a preferred chunk size.

| Configuration Parameter | Value | Significance |
|---|---|---|
| $C_{min}$ | 16384 | Minimum target chunk size in bytes |

When queried for the preferred chunk size for origin server I, CM 122 of embodiments may operate as follows:

```
Compute Qallow_I
T = current T value
C_Target(I) = max(T/(Qallow_I + 1), C_min)
```

In operation according to embodiments, RM 121 uses the preferred chunk size (CTarget(I)) value from CM 122 to chunk the next scheduled request from UA 129 for an origin server I for issue to CM 122. Accordingly, the RM may use a Chunking Algorithm to provide chunking of requests. Goals of the Chunking Algorithm used by RM 121 of embodiments include: To make the chunk size approximately CTarget(I) value that RM 121 fetches from CM 122; To spread the chunk sizes of different chunk requests to avoid syncing of request completion times (e.g., the chunk sizes may be spread proportional to the preferred chunk size CTarget(I)); and/or To avoid making a tiny chunk request. The configuration parameters for chunking used by RM 121 of embodiments are set forth below:

| Configuration Parameter | Value | Significance |
|---|---|---|
| chunk_spread | 0.5 | Chunk spread. The chunking algorithm tries to make chunk size in the range $C_{Target(I)}$ to $C_{Target(I)} * (1 + chunk\_spread)$ |
| chunk_hysteresis | 1.5 | Hysteresis. Prefer growing chunk size by a factor of chunk_hysteresis to a small leftover request |

In operation according to embodiments, RM 121 also uses a persistent (e.g., during the runtime of the TA 120) counter ctr, initialized to 0 at startup. The counter ctr may most conveniently be implemented as a 32 bit unsigned integer.

```
N = Remaining unrequested bytes in the request to be chunked
    or None for open-ended byte range requests
Calculate p = ceil (C_Target(I) * (1 + chunk_spread*(reverse_bits(ctr) /
2**32)))
// Note: reverse_bits( ) reverses the bits in a word.
// See below.
if N is not None,
    if chunk_hysteresis*p < N,
        set ChunkSize = p
    else:
        set ChunkSize = N
else:
    set ChunkSize = p
ctr = (ctr + 1) % (2**32)
return ChunkSize
```

The reverse_bits( ) function reverses the bits in a 32-bit unsigned int, whereby the most significant becomes the least significant one, the second most significant bit becomes the second least significant one, and so on. The function has the property to spread integers in the range from 0 to $2^{32}-1$, and does spread short sequences with larger distances than random spreading would. For reference, the function can be implemented as follows:

```
uint32_t reverse_bits(uint32_t x)
{
#define flip(x, mask, shift)  \
    ((((x) & mask) << shift) ^ (((x) & ~mask) >> shift))
    x = flip(x, 0x55555555, 1);
    x = flip(x, 0x33333333, 2);
    x = flip(x, 0x0f0f0f0f, 4);
    x = flip(x, 0x00ff00ff, 8);
```

-continued

```
        x = flip(x, 0x0000ffff, 16);
        return x;
#undef flip
}
```

In operation according to embodiments, HTTP requests received from user agents, including a browser, are split in RM 121 and chunk requests are sent to CM 122. CM 122 of embodiments decides when a new chunk request can be sent and which origin servers are available for processing new chunk requests. RM 121 of embodiments gets an opportunity to schedule chunk requests for issue to CM 122 under the following conditions: Whenever RM 121 receives a new data download request from UA 129; Whenever data is received for an already issued chunk request; and Whenever RM 121 successfully issues a chunk request to CM 122 as CM 122 might be ready to issue more requests for the same or different origin servers. In operation according to embodiments, RM 121 chooses the next request from UA 129 to split and hand over a chunk request to CM 122, whereby the RM may use a request scheduling algorithm to achieve this. Goals of the request scheduling algorithm of embodiments are to: Ensure that no connection from UAs 129 is starved when TA 120 is present if it would not be starved when TA 120 is not present; Achieve fairness across connections (between UAs 129 and proxy server) or across origin servers; and To be work conserving (e.g., if at least one flow can be served at a scheduling opportunity, at least one request will be served). A simple round robin scheduling can be used across the different queues by RM 121 of embodiments. The request scheduler of embodiments keeps track of the last queue served, and when given an opportunity to schedule another chunk request, it picks the head request from the next queue and tests CM 122 for readiness for the origin server for that request. More sophisticated scheduling algorithms employed by the RM 121 can also be used, if desired.

At startup, parameters used by a request scheduler may be initialized as follows:

Set current_queue_id=0//Keeps track of the last queue served

When given an opportunity to schedule requests with CM 122, RM 121 of embodiments performs the following in a loop till a false is returned:

```
// *** step 1: get the ordered list of active queues.
// Create a list of queue ids for queues which have
// outstanding requests that need to be scheduled.
ordered_queues = sort (get_active_queues( ))
if len(ordered_queues) == 0
        return false // No request to schedule
// *** step 2: bring queue list into processing order
//    (i.e., will check queues in that order for requests)
// Find the smallest index i into ordered_queues such that
// ordered_queues[i] >= current_queue_id; or set
// i := len(ordered_queues) if there is no such i
for i = 0, ..., len(ordered_queues):
        if ordered_queues[i] >= current_queue_id,
                break
// arrange ordered_queues in processing order
ordered_queues = ordered_queues[i:] + ordered_queues[:i]
// *** step 3: find next request to issue
// check queues in processing order for a request to issue
for q in ordered_queues
        if CM ready to issue chunk request r at head of queue q,
                issue chunk request r to CM
                current_queue_id = q + 1
```

-continued

```
                return true
        return false
```

Figure 12:
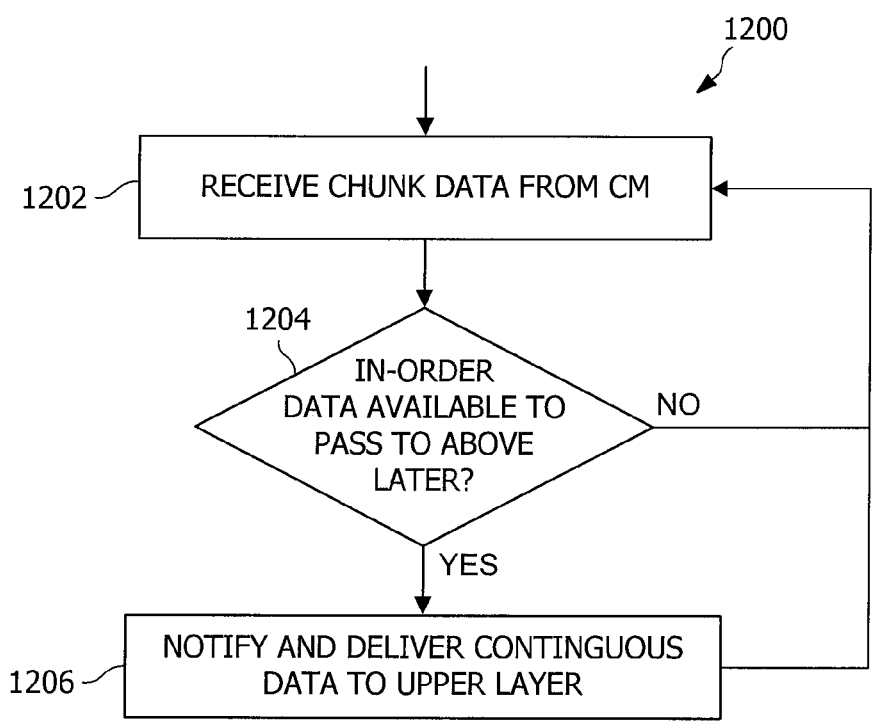
FIG. 12 shows logic for a reordering layer according to embodiments of the present disclosure.

A purpose of reordering layer 194 within RM 121 of embodiments is to provide delivery of contiguous in-order data to the components above. Since incoming data download requests from UA 129 are chunked into multiple chunk requests sent across multiple connections to the origin server, data received back by RM 121 may not be in-order. In operation according to embodiments, reordering layer 194 buffers data received internally within RM 121 and delivers only contiguous data to the layers/components above. Reordering layer 194 of embodiments buffers each queue so that data can be delivered in order. However, missing data on one queue should not block another queue, according to embodiments herein. Logic for reordering layer 194 is shown in FIG. 12.

Figure 13A:
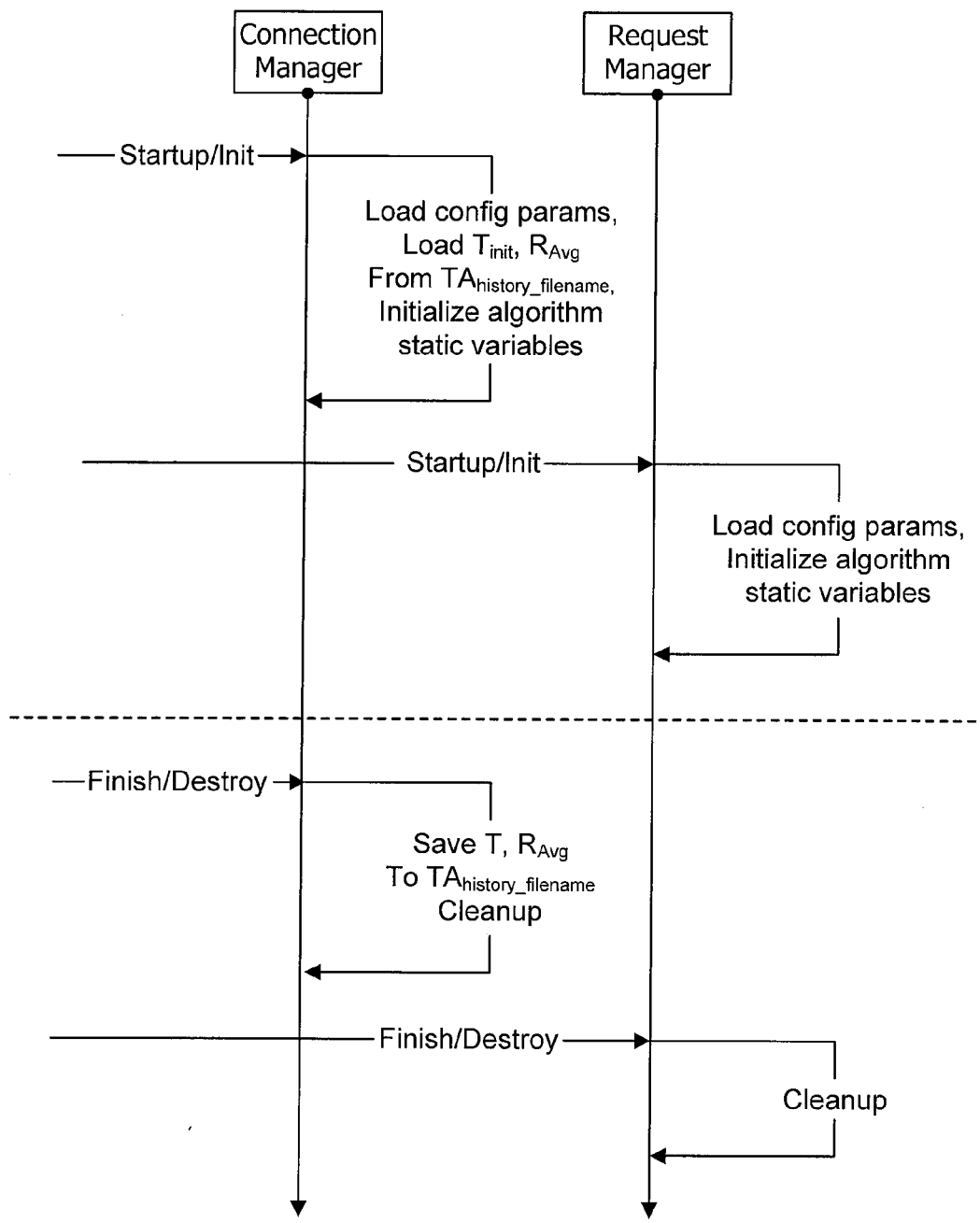
FIGS. 13A-13C show high level call flows for algorithm execution between a Request Manager and a Connection Manager according to embodiments of the present disclosure.
Figure 13B:
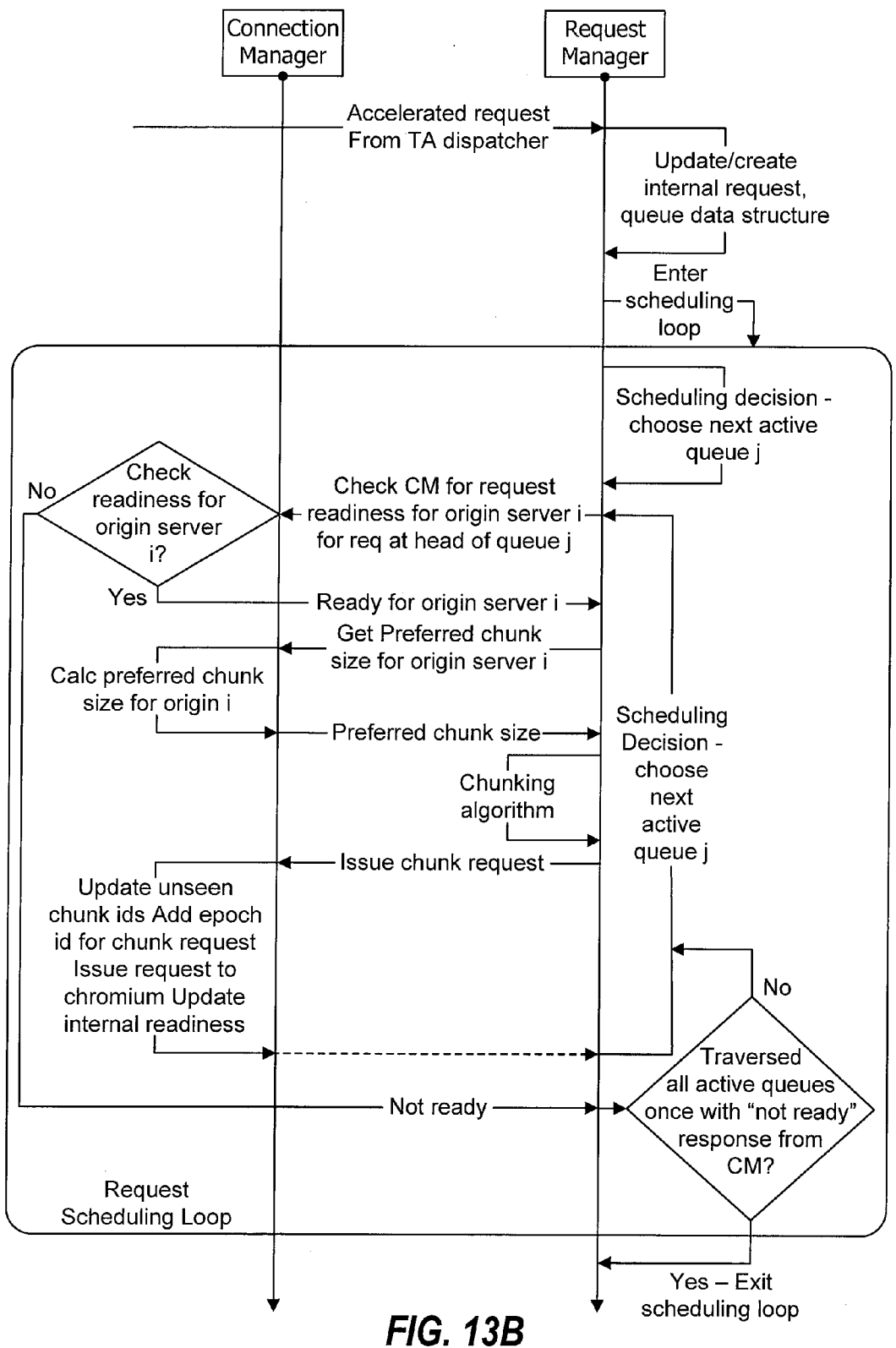
Figure 13C:
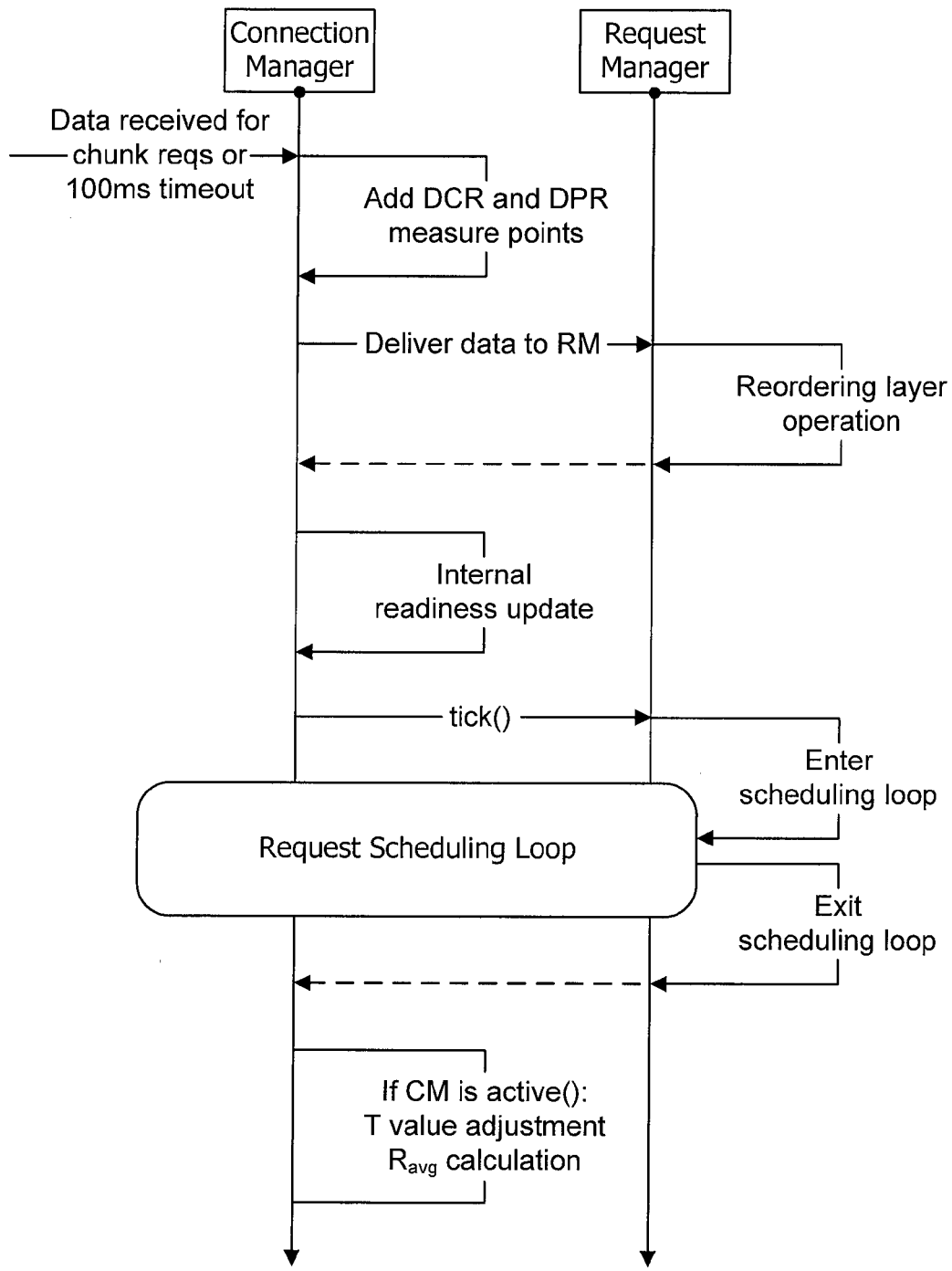

High level call flows for algorithm execution between RM 121 and CM 122 in accordance with the foregoing exemplary embodiment are illustrated in FIGS. 13A, 13B and 13C. In particular, FIG. 13A shows startup and finish call flows in accordance with embodiments herein. FIG. 13B shows a call flow when an accelerated request is received from a Transport Accelerator dispatcher according to embodiments herein. FIG. 13C shows a call flow when chunk data is received from the stack or timeout according to embodiments herein.

Figure 14A:
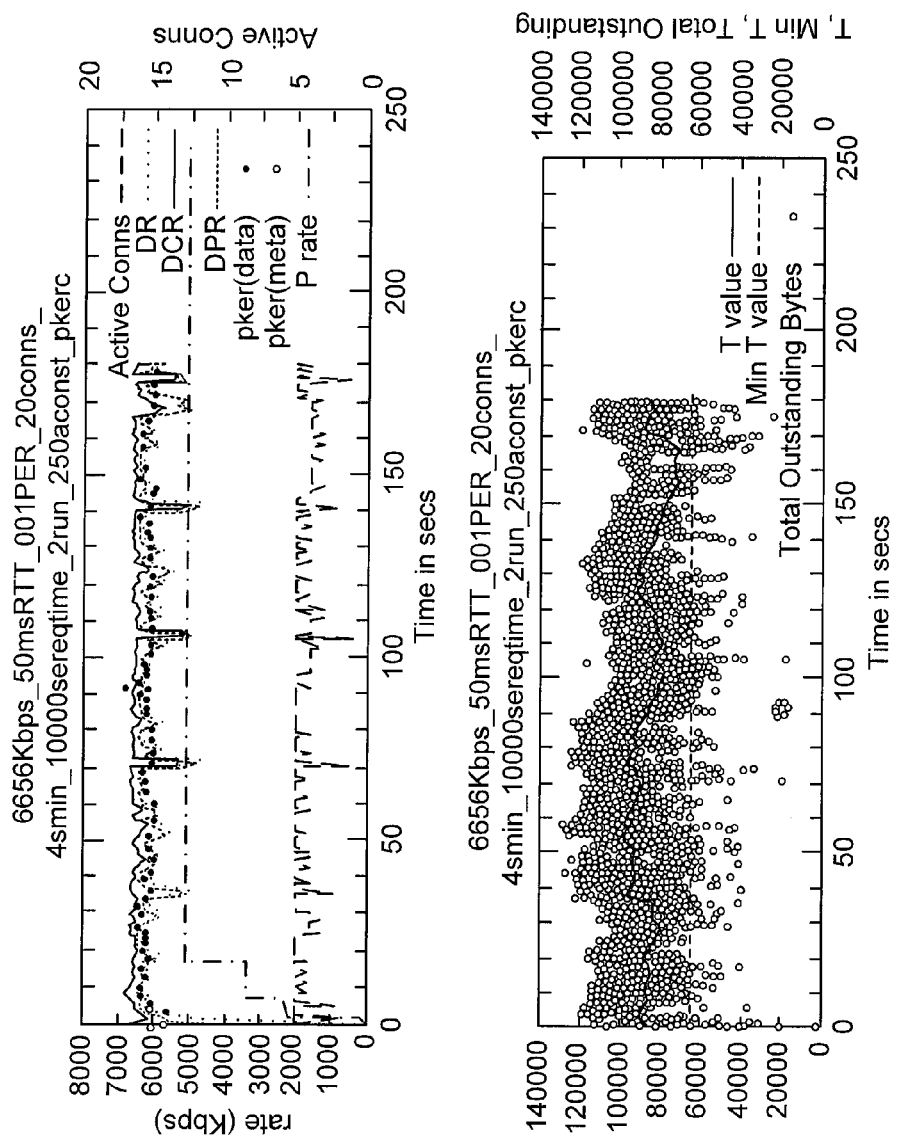
FIGS. 14A-14C show graphs generated for a single User Agent connecting to a single origin server using a Transport Accelerator according to embodiments of the present disclosure.
Figure 14B:
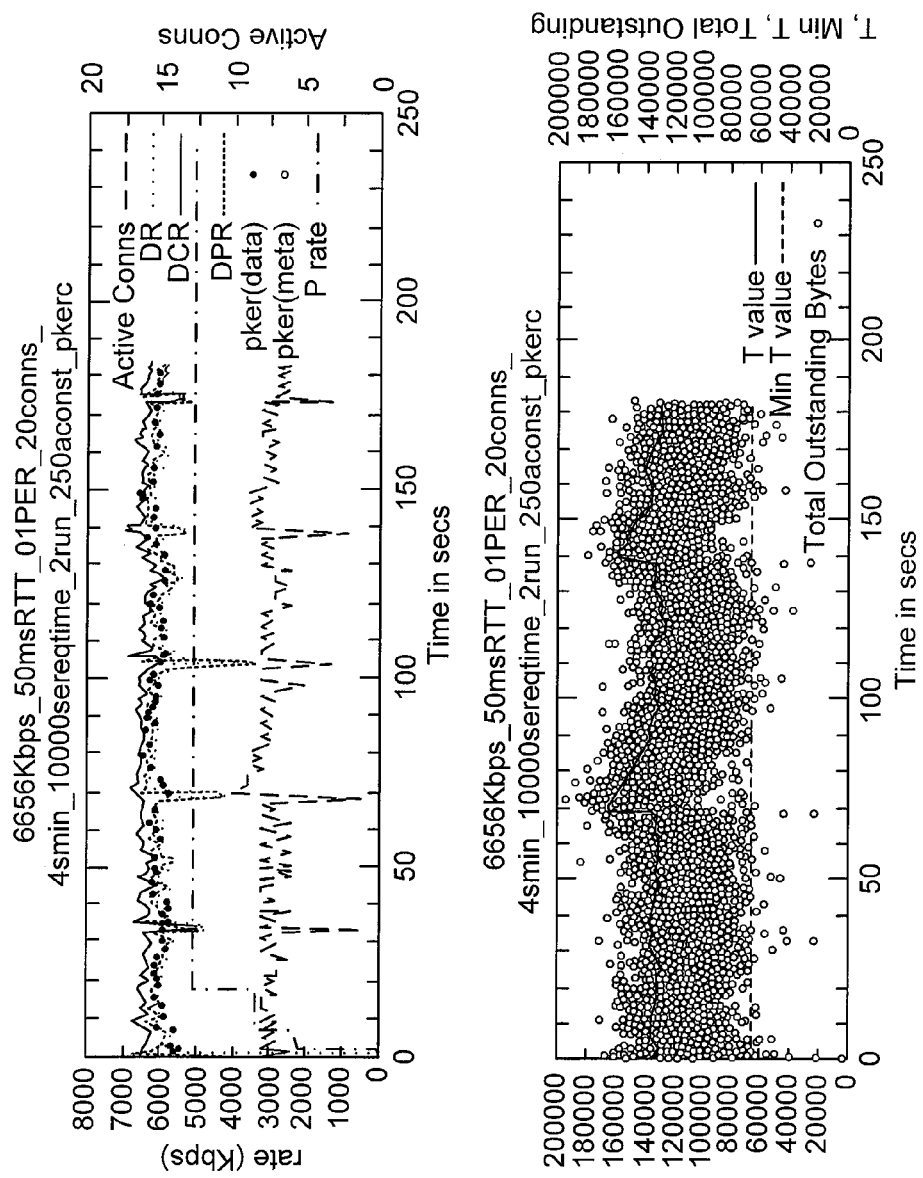
Figure 14C:
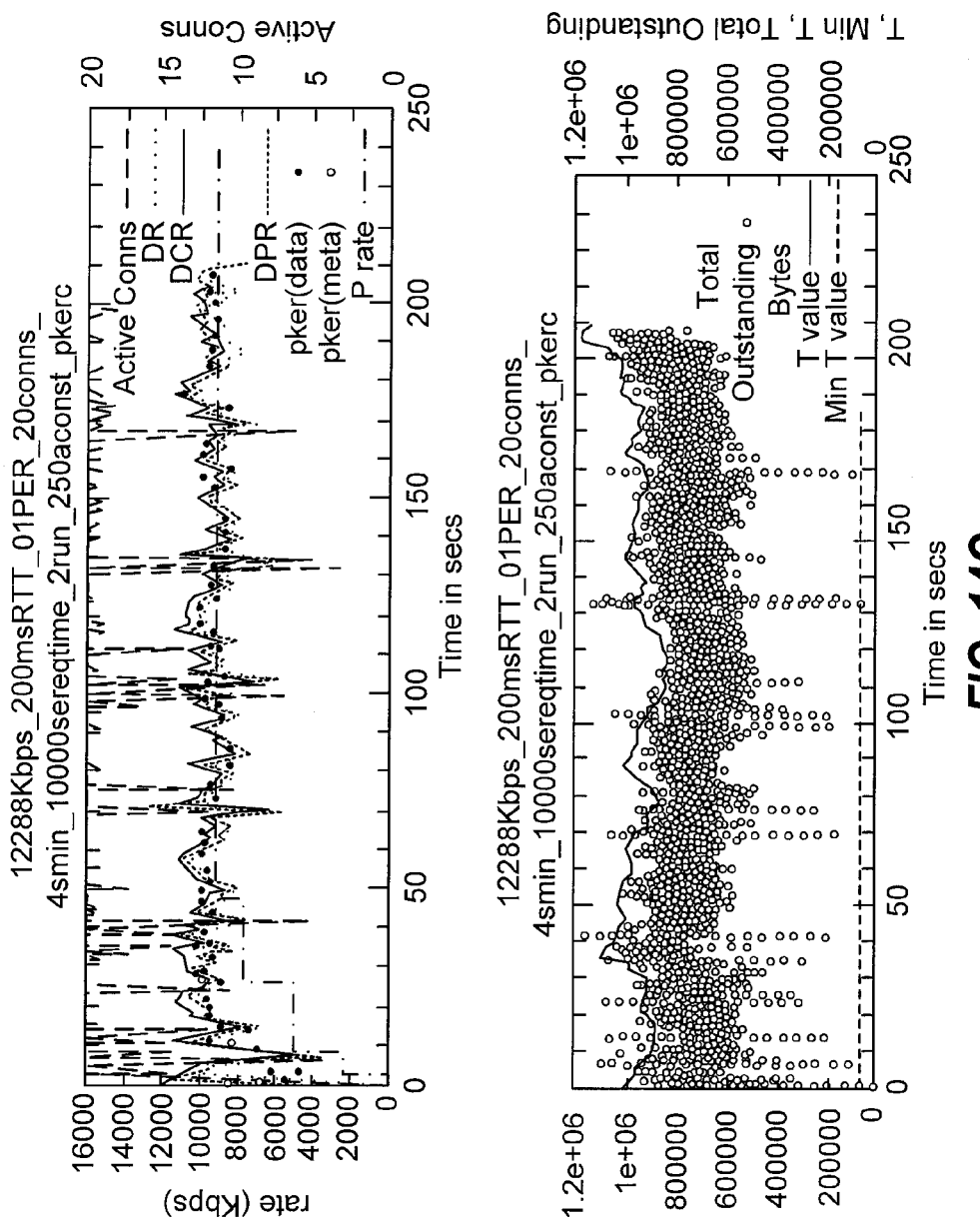

FIGS. 14A, 14B, and 14C show graphs generated for a single UA connecting to a single origin server using TA 120 of an embodiment herein using smin=4 and smaxOrg=20. In the emulation shown in FIG. 14A, the available bandwidth is 6656 Kilobits per second, the packet loss rate is 0.1%, and the round trip time is 50 milliseconds. In this emulation, the value of T on average is approximately 80 Kilobytes, the average number of TCP connections used is approximately 4, and the presentation rate achieved is approximately 5000 Kilobits, which is the highest possible presentation rate that is available below the available bandwidth. In the emulation shown in FIG. 14B, the available bandwidth is 6656 Kilobits per second, the packet loss rate is 1%, and the round trip time is 50 milliseconds. In this emulation, the value of T on average is approximately 120 Kilobytes, the average number of TCP connections used is approximately 7 or 8, and the presentation rate achieved is approximately 5000 Kilobits, which is the highest possible presentation rate that is available below the available bandwidth. Thus, comparing the emulation of FIG. 14B to that of FIG. 14A, with the same available bandwidth and round trip time, but with higher loss in FIG. 14B compared to FIG. 14A, the average number of connections used is higher and the value of T is higher, but still reasonable, and the highest presentation rate is still achieved. In the emulation shown in FIG. 14C, the available bandwidth is 12288 Kilobits per second, the packet loss rate is 1%, and the round trip time is 200 milliseconds. In this emulation, the value of T on average is approximately 1 Megabyte, the average number of TCP connections used is approximately 20, and the presentation rate achieved is approximately 9500 Kilobits, which is the highest possible presentation rate that is available below the available bandwidth. Thus, comparing the emulation of FIG. 14C to that of FIG. 14B, with twice the available bandwidth and four times the round trip time, and with the same loss rate loss, the average number of connections used is higher and the value of T is higher in proportion to the product in the increase in the round trip time and available bandwidth, and the highest presentation rate is still achieved.

It should be appreciated that operation of a transport accelerator may be modified or adapted for use with respect to particular interfaces. For example, an embodiment of a CM implemented according to the concepts herein may operate to be very aggressive with respect to chunk requests when the network interface is 3G/4G/LTE, knowing that the bottleneck is typically the radio access network that is governed by a PFAIR (Proportionate FAIRness) queuing policy that will not be harmful to other User Equipment (UEs) using the network. Correspondingly, embodiments may implement a less aggressive CM when the network interface is over a shared WiFi public access network, which uses a FIFO queuing policy that would be potentially harmful to other less aggressive UEs using the network. Where data is accessed from local storage (e.g., as may have been queued from an earlier broadcast), as opposed to being obtained through a network connection to a content server, embodiments of a transport accelerator may implement a CM adapted for accessing data from a local cache that is a very different design than that used with respect to network connections.

Figure 6:
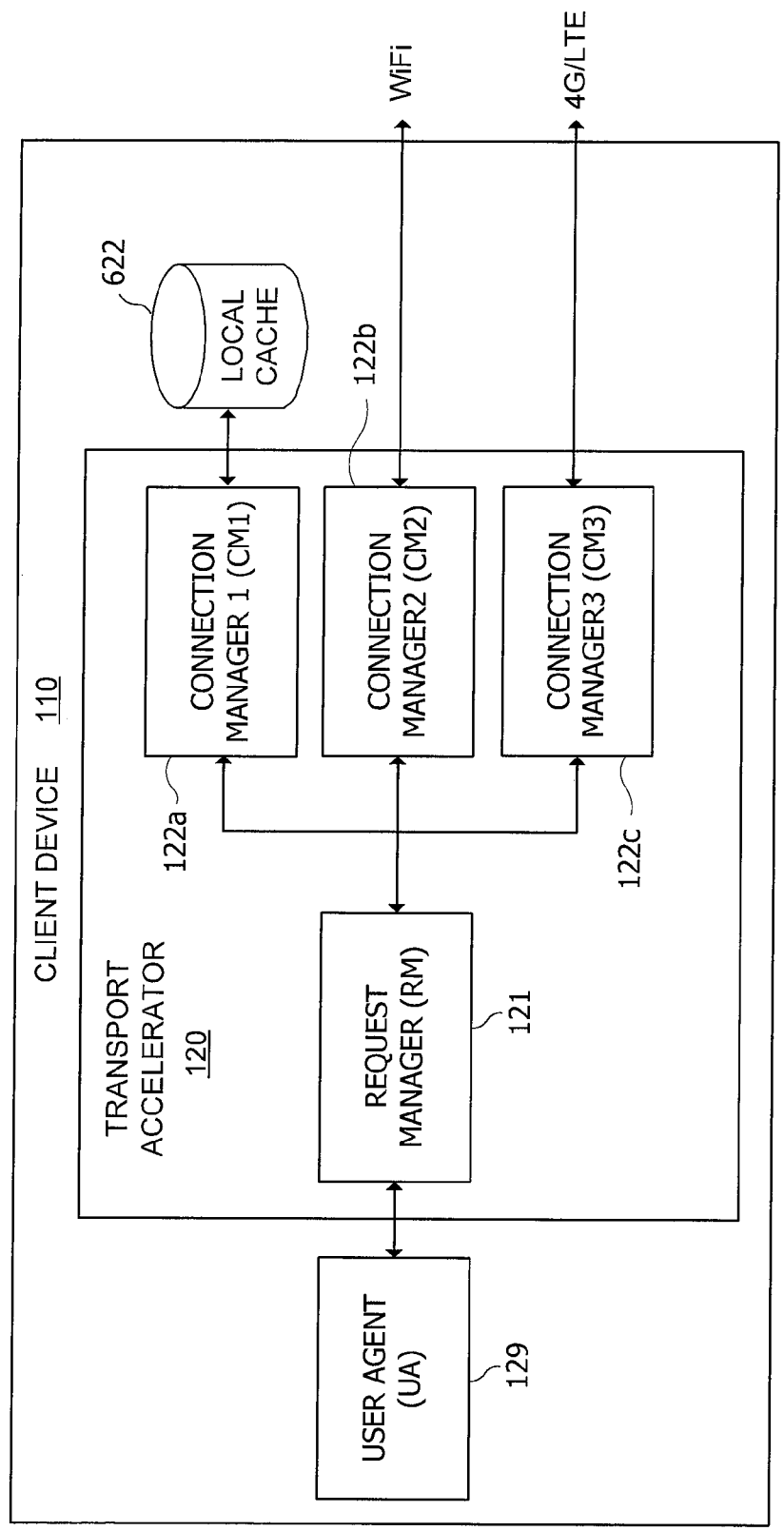
FIG. 6 shows a configuration in which a Request Manager is interfaced with a plurality of Connection Managers according to embodiments of the present disclosure.

Although RM 121 of the embodiment illustrated in FIG. 1A is shown interfaced with a single instance of CM 122, RM 121 of some embodiments may interface with more than one such CM, as shown in the embodiment of FIG. 6. Such CMs may, for example, support a different network interface (e.g., CM 122*a* may have a local interface to on-device cache 622, CM 122*b* may use HTTP/TCP connections to a WiFi network interface, and CM 122*c* may use HTTP/TCP connections to a 4G/LTE network interface, etc.). Additionally or alternatively, such CMs may provide network interfaces which are similar in nature (e.g. different WiFi links). RM 121 may thus interface concurrently with the multiple CMs, whereby RM 121 may, for example, be operable to request data chunks of the same fragment or sequence of fragments from a plurality of CMs (e.g., part of the data requests are sent to a first CM-xTCP that uses HTTP/TCP connections to a 4G/LTE interface and part of the data requests are sent to a second CM-mHTTP that uses HTTP/TCP connections to a WiFi interface). The RM can aggregate the data received from each of the CMs to reconstruct the fragment requested by the UA and provide the response back to the UA.

Additionally or alternatively, although CM 122 of the embodiment illustrated in FIG. 1A is shown interfaced with a single instance of RM 121, CM 122 of some embodiments may interface concurrently with more than one such RM. For example, multiple RMs, each for a different UA of client device 110, may be adapted to use the same CM or CMs, whereby the CMs may be adapted to settle any contention for the connections resulting from concurrent operation of the RMs. Alternatively, a single RM may be adapted for use with respect to a plurality of UAs, whereby the RM is adapted to settle any contention for the connections resulting from the concurrent operation of the UAs.

Although selected aspects have been illustrated and described in detail, it will be understood that various substitutions and alterations may be made therein without departing from the spirit and scope of the present invention, as defined by the following claims.

What is claimed is:

1. A method for accelerating, by a transport accelerator (TA) of a client device, delivery of content to a user agent (UA) of the client device from a content server, the method comprising:

determining, by a connection manager (CM) of the TA, target content chunk size information for chunks of the content used for delivery of the content from the content server to the CM;

signaling, from the CM to a request manager (RM) of the TA, the determined target content chunk size information, wherein the signaling is in association with the CM signaling that it is ready for another chunk request from the RM;

receiving, by the RM, fragment requests provided by the UA;

determining, by the RM, a size of one or more content chunks of chunk requests for content of the fragment requests provided by the UA based on the target content chunk size information signaled from the CM to the RM;

subdividing, by the RM, the fragment requests provided by the UA each into a plurality of chunk requests for requesting content chunks of the size determined by the RM based on the target content chunk size information signaled from the CM to the RM;

providing, by the RM to the CM, chunk requests for content chunks having the size determined by the RM based on the target content chunk size information signaled from the CM to the RM for the CM requesting chunks of the content from the content server; and requesting, by the CM, the chunks of the content having the size determined by the RM from the content server via a plurality of connections established between the CM and the content server.

2. The method of claim 1, wherein determining the size of the one or more content chunks of the chunk requests by the RM is based upon responses to chunk requests provided by the content server.

3. The method of claim 1, wherein determining the target content chunk size information by the CM is based on an amount of data that the content server can immediately send over that connection.

4. The method of claim 1, wherein determining the target content chunk size information by the CM is based on overhead of upstream data provided by the TA to the content server.

5. The method of claim 1, further comprising:
determining a minimum size of the content chunks of the chunk requests, wherein fragments of a size less than the minimum size are requested using one chunk request.

6. The method of claim 1, further comprising:
determining a maximum size of the content chunks of the chunk requests, wherein fragments are partitioned into chunk requests that are of size less than or equal to the maximum size.

7. The method of claim 1, further comprising:
determining at least a first chunk request before obtaining a size of a corresponding fragment of the fragment requests.

8. The method of claim 1, wherein determining the target content chunk size information by the CM is independent of a size of fragments of the fragment requests.

9. The method of claim 1, wherein the target content chunk size information by the CM is based on a size facilitating the content server immediately sending an entire Hypertext Transfer Protocol (HTTP) response over a Transmission Control Protocol (TCP) connection between the CM and the content server as soon as the content server receives a HTTP chunk request.

10. The method of claim 1, wherein determining the target content chunk size information by the CM is based on a size adapted to facilitate arrival of chunks of content at the TA in an order of the requests for chunks made by the CM.

11. The method of claim 1, further comprising:
dynamically adjusting, by the CM, a number of connections of the plurality of connections established between the CM and the content server.

12. The method of claim 1, wherein the requesting the chunks of the plurality of chunks from the content server via a plurality of connections comprises requesting the plurality of chunks in parallel via the plurality of connections.

13. The method of claim 12, wherein sizes of consecutive chunk requests of the plurality of chunks are chosen to vary so as to reduce a likelihood that chunk requests complete at the same time.

14. The method of claim 12, wherein a chunk request that has not been completely served by the content server on a first connection of the plurality of connections is resent at least in part using one or more different connections of the plurality of connections.

15. The method of claim 12, further comprising:
controlling, by the CM, a receive window size for each connection of the plurality of connections to provide an approximately same download rate for each of the connections.

16. The method of claim 1, further comprising:
calculating, by the CM, a maximum amount of requested-but-not-yet-received data to allow on one or more connections of the plurality of connections before the CM makes another chunk request.

17. The method of claim 16, wherein the calculating the maximum amount of requested-but-not-yet-received data comprises:
utilizing a Download Pipeline Rate (DPR) metric and a Download Chunk Rate (DCR) metric to determine a threshold (Thresh) for requesting more data when outstanding requested data (B) remains.

18. The method of claim 1, wherein determining the target content chunk size information by the CM comprises:
calculating, by the CM, a target chunk size.

19. The method of claim 18, wherein the calculating the target chunk size comprises:
utilizing a Download Pipeline Rate (DPR) metric and a Download Chunk Rate (DCR) metric to determine a target chunk size (T) to be used in determining sizes of chunks to request.

20. The method of claim 1, wherein the requesting the chunks of the plurality of chunks comprises:
withholding making a next request for a chunk of content on a particular connection of the plurality of connections until any previous request on that connection has completed.

21. The method of claim 1, wherein the requesting the chunks of the plurality of chunks comprises:
making a next request for a chunk of content on a particular connection of the plurality of connections when one or more previous requests on that connection has not yet completed.

22. An apparatus configured for accelerating, by a transport accelerator (TA) of a client device, delivery of content to a user agent (UA) of the client device from a content server, the apparatus comprising:
means for determining, by a connection manager (CM) of the TA, target content chunk size information for chunks of the content used for delivery of the content from the content server to the CM;
means for signaling, from the CM to a request manager (RM) of the TA, the determined target content chunk size information, wherein the signaling is in association with the CM signaling that it is ready for another chunk request from the RM;
means for receiving, by the RM, fragment requests provided by the UA;
means for determining, by the RM, a size of one or more content chunks of chunk requests for content of the fragment requests provided by the UA based on the target content chunk size information signaled from the CM to the RM;
means for subdividing, by the RM, the fragment requests provided by the UA each into a plurality of chunk requests for requesting content chunks of the size determined by the RM based on the target content chunk size information signaled from the CM to the RM;
means for providing, by the RM to the CM, chunk requests for content chunks having the size determined by the RM based on the target content chunk size information signaled from the CM to the RM for the CM requesting chunks of the content from the content server; and
means for requesting, by the CM, the chunks of the content having the size determined by the RM from the content server via a plurality of connections established between the CM and the content server.

23. The apparatus of claim 22, wherein the means for determining, by the RM, the size of the one or more content chunks of the chunk requests determines the size based upon responses to chunk requests provided by the content server.

24. The apparatus of claim 22, wherein the means for determining, by the CM, the target content chunk size information determines the target content chunk size information based on an amount of data that the content server can immediately send over that connection.

25. The apparatus of claim 22, wherein the means for determining, by the CM, the target content chunk size information determines the target content chunk size information based on overhead of upstream data provided by the TA to the content server.

26. The apparatus of claim 22, further comprising:
means for determining a minimum size of the content chunks of the chunk requests, wherein fragments of a size less than the minimum size are requested using one chunk request.

27. The apparatus of claim 22, further comprising:
means for determining a maximum size of the content chunks of the chunk requests, wherein fragments are partitioned into chunk requests that are of size less than or equal to the maximum size.

28. The apparatus of claim 22, further comprising:
means for determining at least a first chunk request before obtaining a size of a corresponding fragment of the fragment requests.

29. The apparatus of claim 22, wherein the means for determining, by the CM, the target content chunk size information determines the target content chunk size information independent of a size of fragments of the fragment requests.

30. The apparatus of claim 22, wherein the means for determining, by the CM, the target content chunk size information determines the target content chunk size information based on a size facilitating the content server immediately sending an entire Hypertext Transfer Protocol (HTTP) response over a Transmission Control Protocol (TCP) connection between the CM and the content server as soon as the content server receives a HTTP chunk request.

31. The apparatus of claim 22, wherein the means for determining, by the CM, the target content chunk size information determines the target content chunk size information based on a size adapted to facilitate arrival of chunks of content at the TA in an order of the requests for chunks made by the CM.

32. The apparatus of claim 22, further comprising:
means for dynamically adjusting, by the CM, a number of connections of the plurality of connections established between the CM and the content server.

33. The apparatus of claim 22, wherein the means for requesting the chunks of the plurality of chunks from the content server via a plurality of connections comprises means for requesting the plurality of chunks in parallel via the plurality of connections.

34. The apparatus of claim 33, wherein sizes of consecutive chunk requests of the plurality of chunks are chosen to vary so as to reduce a likelihood that chunk requests complete at the same time.

35. The apparatus of claim 33, wherein a chunk request that has not been completely served by the content server on a first connection of the plurality of connections is resent at least in part using one or more different connections of the plurality of connections.

36. The apparatus of claim 33, further comprising:
means for controlling, by the CM, a receive window size for each connection of the plurality of connections to provide an approximately same download rate for each of the connections.

37. The apparatus of claim 22, further comprising:
means for calculating, by the CM, a maximum amount of requested-but-not-yet-received data to allow on one or more connections of the plurality of connections before the CM makes another chunk request.

38. The apparatus of claim 37, wherein the means for calculating the maximum amount of requested-but-not-yet-received data comprises:
means for utilizing a Download Pipeline Rate (DPR) metric and a Download Chunk Rate (DCR) metric to determine a threshold (Thresh) for requesting more data when outstanding requested data (B) remains.

39. The apparatus of claim 22, wherein the means for determining the target content chunk size information comprises:
means for calculating, by the CM, a target chunk size.

40. The apparatus of claim 39, wherein the means for calculating the target chunk size comprises:
means for utilizing a Download Pipeline Rate (DPR) metric and a Download Chunk Rate (DCR) metric to determine a target chunk size (T) to be used in determining sizes of chunks to request.

41. The apparatus of claim 22, wherein the means for requesting the chunks of the plurality of chunks comprises:
means for withholding making a next request for a chunk of content on a particular connection of the plurality of connections until any previous request on that connection has completed.

42. The apparatus of claim 22, wherein the means for requesting the chunks of the plurality of chunks comprises:
means for making a next request for a chunk of content on a particular connection of the plurality of connections when one or more previous requests on that connection has not yet completed.

43. A computer program product for accelerating, by a transport accelerator (TA) of a client device, delivery of content to a user agent (UA) of the client device from a content server, the computer program product comprising:
a non-transitory computer-readable medium having program code recorded thereon, the program code including:
program code to determine, by a connection manager (CM) of the TA, target content chunk size information for chunks of the content used for delivery of the content from the content server to the CM;
program code to signal, from the CM to a request manager (RM) of the TA, the determined target content chunk size information, wherein signaling of the target content chunk size information is in association with the CM signaling that it is ready for another chunk request from the RM;
program code to receive, by the RM, fragment requests provided by the UA;
program code to determine, by the RM, a size of one or more content chunks of chunk requests for content of the fragment requests provided by the UA based on the target content chunk size information signaled from the CM to the RM;
program code to subdivide, by the RM, the fragment requests provided by the UA each into a plurality of chunk requests for requesting content chunks of the size determined by the RM based on the target content chunk size information signaled from the CM to the RM;
program code to provide, by the RM to the CM, chunk requests for content chunks having the size determined by the RM based on the target content chunk size information signaled from the CM to the RM for the CM requesting chunks of the content from the content server; and
program code to request, by the CM, the chunks of the content having the size determined by the RM from the content server via a plurality of connections established between the CM and the content server.

44. The computer program product of claim 43, wherein the program code to determine, by the RM, the size of the one or more content chunks of the chunk requests determines the size based upon responses to chunk requests provided by the content server.

45. The computer program product of claim 43, wherein the program code to determine, by the CM, the target content chunk size information determines the target content chunk size based on an amount of data that the content server can immediately send over that connection.

46. The computer program product of claim 43, further comprising:
program code to determine at least a first chunk request before obtaining a size of a corresponding fragment of the fragment requests.

47. The computer program product of claim 43, wherein the program code to determine, by the CM, the target content chunk size information determines the target content chunk size independent of a size of fragments of the fragment requests.

48. The computer program product of claim 43, wherein the program code to determine, by the CM, the target content chunk size information determines the target content chunk size information based on a size facilitating the content server immediately sending an entire Hypertext Transfer Protocol (HTTP) response over a Transmission Control Protocol (TCP) connection between the CM and the content server as soon as the content server receives a HTTP chunk request.

49. The computer program product of claim 43, wherein the program code to determine, by the CM, the target content chunk size information determines the target content chunk size information based on a size adapted to facilitate arrival of chunks of content at the TA in an order of the requests for chunks made by the CM.

50. The computer program product of claim 43, further comprising:
program code to dynamically adjust, by the CM, a number of connections of the plurality of connections established between the CM and the content server.

51. The computer program product of claim 43, wherein the program code to request the chunks of the plurality of chunks from the content server via a plurality of connections comprises program code to request the plurality of chunks in parallel via the plurality of connections, and wherein sizes of consecutive chunk requests of the plurality of chunks are chosen to vary so as to reduce a likelihood that chunk requests complete at the same time.

52. The computer program product of claim 43, further comprising:
program code to calculate, by the CM, a maximum amount of requested-but-not-yet-received data to allow on the one or more connections before the CM makes another chunk request.

53. The computer program product of claim 52, wherein the program code to calculate the maximum amount of requested-but-not-yet-received data comprises:
program code to utilize a Download Pipeline Rate (DPR) metric and a Download Chunk Rate (DCR) metric to determine a threshold (Thresh) for requesting more data when outstanding requested data (B) remains.

54. The computer program product of claim 43, further comprising:
program code to calculate, by the CM, a target chunk size using a Download Pipeline Rate (DPR) metric and a Download Chunk Rate (DCR) metric to determine a target chunk size (T).

55. An apparatus configured for accelerating, by a transport accelerator (TA) of a client device, delivery of content to a user agent (UA) of the client device from a content server, the apparatus comprising:
at least one processor; and
a memory coupled to the at least one processor,
wherein the at least one processor is configured:
to determine, by a connection manager (CM) of the TA, target content chunk size information for chunks of the content used for delivery of the content from the content server to the CM;
to signal, from the CM to a request manager (RM) of the TA, the determined target content chunk size information, wherein signaling of the target content chunk size information is in association with the CM signaling that it is ready for another chunk request from the RM;
to receive, by the RM, fragment requests provided by the UA;
to determine, by the RM, a size of one or more content chunks of chunk requests for content of the fragment requests provided by the UA based on the target content chunk size information signaled from the CM to the RM;
to subdivide, by the RM, the fragment requests provided by the UA each into a plurality of chunk requests for requesting content chunks of the size determined by the RM based on the target content chunk size information signaled from the CM to the RM;
to provide, by the RM to the CM, chunk requests for content chunks having the size determined by the RM based on the target content chunk size information signaled from the CM to the RM for the CM requesting chunks of the content from the content server; and
to request, by the CM, the chunks of the content having the size determined by the RM from the content server via a plurality of connections established between the CM and the content server.

56. The apparatus of claim 55, wherein the at least one processor is further configured:
to dynamically adjust a number of connections of the plurality of connections established between the CM and the content server.

57. The apparatus of claim 55, wherein the at least one processor is further configured:
to calculate a maximum amount of requested-but-not-yet-received data to allow on one or more connections of the plurality of connections before the CM makes another chunk request, wherein calculation of the maximum amount of requested-but-not-yet-received data utilizes a Download Pipeline Rate (DPR) metric and a Download Chunk Rate (DCR) metric to determine a threshold (Thresh) for requesting more data when outstanding requested data (B) remains.

58. The apparatus of claim 55, wherein the at least one processor is further configured:
to calculate a target chunk size utilizing a Download Pipeline Rate (DPR) metric and a Download Chunk Rate (DCR) metric to determine a target chunk size (T) to be used in determining sizes of chunks to request.

* * * * *